United States Patent
Holley

(10) Patent No.: US 9,900,177 B2
(45) Date of Patent: Feb. 20, 2018

(54) MAINTAINING UP-TO-DATE HOME AUTOMATION MODELS

(71) Applicant: EchoStar Technologies, LLC, Englewood, CO (US)

(72) Inventor: Eric Holley, Atlanta, GA (US)

(73) Assignee: ECHOSTAR TECHNOLOGIES INTERNATIONAL CORPORATION, Englewood, CO (US)

(*) Notice: Subject to any disclaimer, the term of this patent is extended or adjusted under 35 U.S.C. 154(b) by 603 days.

(21) Appl. No.: 14/475,252

(22) Filed: Sep. 2, 2014

(65) Prior Publication Data

US 2015/0160623 A1    Jun. 11, 2015

Related U.S. Application Data

(60) Provisional application No. 61/914,856, filed on Dec. 11, 2013.

(51) Int. Cl.
*G06F 17/00* (2006.01)
*H04L 12/28* (2006.01)
(Continued)

(52) U.S. Cl.
CPC ...... *H04L 12/2825* (2013.01); *G07C 9/00571* (2013.01); *H04N 21/4131* (2013.01);
(Continued)

(58) Field of Classification Search
CPC .............. H04L 12/2825; H04L 12/282; H04L 63/1408; H04L 67/02; H04L 65/607;
(Continued)

(56) References Cited

U.S. PATENT DOCUMENTS 4,127,966 A    12/1978  Schmidt
4,386,436 A    5/1983   Kocher et al.
(Continued)

FOREIGN PATENT DOCUMENTS

CA    2 267 988 A1    4/1998
CN    105814555 A     7/2016
(Continued)

OTHER PUBLICATIONS

International Search Report and Written Opinion for PCT/EP2015/073299 dated Jan. 4, 2016, 12 pages.
(Continued)

*Primary Examiner* — Tuan Vu
(74) *Attorney, Agent, or Firm* — Kilpatrick Townsend & Stockton LLP

(57) ABSTRACT

Embodiments detailed herein may involve a first status update of a home automation device installed as part of a home automation system in a home being received. An entry of a plurality of entries in a master home automation model may be updated based on the first status update of the home automation device. The master home automation model may be maintained by the home automation host system. The plurality of entries may correspond to home automation device characteristics of the plurality of home automation devices. A numerical identifier used to track status updates related to the home automation system in the home may be incremented. Within the master home automation model, the incremented numerical identifier may be assigned to the updated entry in the master home automation model.

9 Claims, 9 Drawing Sheets

(51) Int. Cl.
*H04N 21/41* (2011.01)
*H04N 21/426* (2011.01)
*H04N 21/472* (2011.01)
*H04N 21/478* (2011.01)
*H04N 21/61* (2011.01)
*G07C 9/00* (2006.01)
*H04N 21/422* (2011.01)
*G05B 11/01* (2006.01)
*G05B 15/02* (2006.01)
*H04N 21/436* (2011.01)
*H04N 21/4363* (2011.01)
*E05B 47/00* (2006.01)

(52) U.S. Cl.
CPC ....... *H04N 21/422* (2013.01); *H04N 21/4263* (2013.01); *H04N 21/42202* (2013.01); *H04N 21/478* (2013.01); *H04N 21/47217* (2013.01); *H04N 21/6143* (2013.01); *E05B 2047/0068* (2013.01); *E05B 2047/0069* (2013.01); *E05B 2047/0094* (2013.01); *G05B 11/01* (2013.01); *G05B 15/02* (2013.01); *G05B 2219/2642* (2013.01); *G07C 2209/62* (2013.01); *H04L 12/2838* (2013.01); *H04N 21/43615* (2013.01); *H04N 21/43637* (2013.01); *Y10T 292/096* (2015.04)

(58) Field of Classification Search
CPC ............ G06F 19/3418; G05B 23/0208; G05B 25/004; E05B 19/22; G01V 1/364; A61B 5/1112
See application file for complete search history.

(56) References Cited

U.S. PATENT DOCUMENTS

| | | | |
|---|---|---|---|
| 4,581,606 A | 4/1986 | Mallory | |
| 4,694,607 A | 9/1987 | Ishida et al. | |
| 4,728,949 A | 3/1988 | Platte et al. | |
| 4,959,713 A | 9/1990 | Morotomi et al. | |
| 5,400,246 A | 3/1995 | Wilson et al. | |
| 5,770,896 A | 6/1998 | Nakajima | |
| 5,805,442 A | 9/1998 | Crater et al. | |
| 5,822,012 A | 10/1998 | Jeon et al. | |
| 5,886,638 A | 3/1999 | Tanguay | |
| 5,894,331 A | 4/1999 | Yang | |
| 5,926,090 A | 7/1999 | Taylor et al. | |
| 5,970,030 A | 10/1999 | Dimitri et al. | |
| 6,081,758 A | 6/2000 | Parvulescu | |
| 6,104,334 A | 8/2000 | Allport | |
| 6,107,918 A | 8/2000 | Klein et al. | |
| 6,107,935 A | 8/2000 | Comerford et al. | |
| 6,119,088 A | 9/2000 | Ciluffo | |
| 6,142,913 A | 11/2000 | Ewert | |
| 6,182,094 B1 | 1/2001 | Humpleman et al. | |
| 6,225,938 B1 | 5/2001 | Hayes et al. | |
| 6,286,764 B1 | 9/2001 | Garvey et al. | |
| 6,330,621 B1 | 12/2001 | Bakke et al. | |
| 6,337,899 B1 | 1/2002 | Alcendor et al. | |
| 6,377,858 B1 | 4/2002 | Koeppe | |
| 6,405,284 B1 | 6/2002 | Bridge | |
| 6,415,257 B1 | 7/2002 | Jungua et al. | |
| 6,502,166 B1 | 12/2002 | Cassidy | |
| 6,529,230 B1 | 3/2003 | Chong | |
| 6,543,051 B1 | 4/2003 | Manson et al. | |
| 6,553,375 B1 | 4/2003 | Huang et al. | |
| 6,663,375 B1 | 8/2003 | Huang et al. | |
| 6,646,676 B1 | 11/2003 | DaGraca et al. | |
| 6,662,282 B2 | 12/2003 | Cochran | |
| 6,744,771 B1 | 6/2004 | Barber et al. | |
| 6,748,343 B2 | 6/2004 | Alexander et al. | |
| 6,751,657 B1 | 6/2004 | Zothner | |
| 6,756,998 B1 | 6/2004 | Bilger | |
| 6,876,889 B1 | 4/2005 | Lortz et al. | |
| 6,891,838 B1 * | 5/2005 | Petite | H04L 12/2825 340/870.02 |
| 6,931,104 B1 | 8/2005 | Foster et al. | |
| 6,976,187 B2 | 12/2005 | Arnott et al. | |
| 6,989,731 B1 | 1/2006 | Kawai et al. | |
| 7,009,528 B2 | 3/2006 | Griep | |
| 7,010,332 B1 | 3/2006 | Irvin et al. | |
| 7,088,238 B2 | 8/2006 | Karaoguz et al. | |
| 7,103,545 B2 | 9/2006 | Furuta | |
| 7,143,298 B2 | 11/2006 | Wells et al. | |
| 7,216,002 B1 | 5/2007 | Anderson | |
| 7,234,074 B2 | 6/2007 | Cohn et al. | |
| 7,260,538 B2 | 8/2007 | Calderone et al. | |
| 7,346,917 B2 | 3/2008 | Gatto et al. | |
| 7,372,370 B2 | 5/2008 | Stults et al. | |
| 7,386,666 B1 | 6/2008 | Beauchamp et al. | |
| 7,391,319 B1 | 6/2008 | Walker | |
| 7,395,369 B2 | 7/2008 | Sepez et al. | |
| 7,395,546 B1 | 7/2008 | Asmussen | |
| 7,529,677 B1 | 5/2009 | Wittenberg | |
| 7,574,494 B1 | 8/2009 | Mayernick et al. | |
| 7,579,945 B1 | 8/2009 | Richter et al. | |
| 7,590,703 B2 | 9/2009 | Cashman et al. | |
| 7,640,351 B2 | 12/2009 | Reckamp et al. | |
| 7,659,814 B2 | 2/2010 | Chen et al. | |
| 7,694,005 B2 | 4/2010 | Reckamp et al. | |
| 7,739,718 B1 | 6/2010 | Young et al. | |
| 7,861,034 B2 | 12/2010 | Yamamoto et al. | |
| 7,870,232 B2 | 1/2011 | Reckamp et al. | |
| 7,945,297 B2 | 5/2011 | Philipp | |
| 7,969,318 B2 | 6/2011 | White et al. | |
| 8,013,730 B2 | 9/2011 | Oh et al. | |
| 8,042,048 B2 | 10/2011 | Wilson et al. | |
| 8,086,757 B2 | 12/2011 | Chang | |
| 8,106,768 B2 | 1/2012 | Neumann | |
| 8,156,368 B2 | 4/2012 | Chambliss et al. | |
| 8,171,148 B2 | 4/2012 | Lucas et al. | |
| 8,180,735 B2 | 5/2012 | Ansari et al. | |
| 8,201,261 B2 | 6/2012 | Barfield et al. | |
| 8,221,290 B2 | 7/2012 | Vincent et al. | |
| 8,275,143 B2 | 9/2012 | Johnson | |
| 8,289,157 B2 | 10/2012 | Patenaude et al. | |
| 8,290,545 B2 | 10/2012 | Terlizzi | |
| 8,310,335 B2 | 11/2012 | Sivakkolundhu | |
| 8,316,413 B2 | 11/2012 | Crabtree | |
| 8,320,578 B2 | 11/2012 | Kahn et al. | |
| 8,335,312 B2 | 12/2012 | Gerhardt et al. | |
| 8,350,694 B1 | 1/2013 | Trundle et al. | |
| 8,413,204 B2 | 4/2013 | White et al. | |
| 8,436,902 B2 | 5/2013 | Kuehnle | |
| 8,498,572 B1 | 7/2013 | Schooley et al. | |
| 8,516,087 B2 | 8/2013 | Wilson et al. | |
| 8,539,567 B1 | 9/2013 | Logue et al. | |
| 8,550,368 B2 | 10/2013 | Butler et al. | |
| 8,619,136 B2 | 12/2013 | Howarter et al. | |
| 8,620,841 B1 | 12/2013 | Filson et al. | |
| 8,644,525 B2 | 2/2014 | Bathurst et al. | |
| 8,645,327 B2 | 2/2014 | Falkenburg et al. | |
| 8,667,529 B2 | 3/2014 | Taxier | |
| 8,750,576 B2 | 6/2014 | Huang et al. | |
| 8,780,201 B1 | 7/2014 | Scalisi et al. | |
| 8,781,508 B1 | 7/2014 | Blakely | |
| 8,786,698 B2 | 7/2014 | Chen et al. | |
| 8,799,413 B2 | 8/2014 | Taylor et al. | |
| 8,818,898 B2 | 8/2014 | Schlossberg et al. | |
| 8,898,709 B2 | 11/2014 | Crabtree | |
| 8,923,823 B1 | 12/2014 | Wilde | |
| 8,930,700 B2 | 1/2015 | Wielopolski | |
| 8,948,793 B1 | 2/2015 | Birkhold et al. | |
| 8,965,170 B1 | 2/2015 | Benea et al. | |
| 9,019,111 B1 | 4/2015 | Sloo et al. | |
| 9,049,567 B2 | 6/2015 | Le Guen et al. | |
| 9,191,804 B1 | 11/2015 | Paczkowski et al. | |
| 9,246,921 B1 | 1/2016 | Vlaminck et al. | |
| 9,258,593 B1 | 2/2016 | Chen et al. | |
| 9,353,500 B1 | 5/2016 | Andreski | |
| 9,443,142 B2 | 9/2016 | Reynolds, Jr. | |
| 9,462,041 B1 | 10/2016 | Hagins et al. | |

(56) References Cited

U.S. PATENT DOCUMENTS

| | | |
|---|---|---|
| 9,495,860 B2 | 11/2016 | Lett |
| 9,511,259 B2 | 12/2016 | Mountain |
| 9,599,981 B2 | 3/2017 | Crabtree |
| 9,621,959 B2 | 4/2017 | Mountain |
| 9,628,286 B1 | 4/2017 | Nguyen et al. |
| 9,632,746 B2 | 4/2017 | Keipert et al. |
| 9,633,186 B2 | 4/2017 | Ingrassia, Jr. et al. |
| 9,729,989 B2 | 8/2017 | Marten |
| 9,769,522 B2 | 9/2017 | Richardson |
| 2001/0012998 A1 | 8/2001 | Jouet et al. |
| 2002/0003493 A1 | 1/2002 | Durst et al. |
| 2002/0019725 A1* | 2/2002 | Petite ............... G05B 23/0208 702/188 |
| 2002/0063633 A1 | 5/2002 | Park |
| 2002/0080238 A1 | 6/2002 | Ohmura |
| 2002/0193989 A1 | 12/2002 | Geilhufe et al. |
| 2003/0005431 A1 | 1/2003 | Shinohara |
| 2003/0052789 A1 | 3/2003 | Colmenarez et al. |
| 2003/0097452 A1 | 5/2003 | Kim et al. |
| 2003/0126593 A1 | 7/2003 | Mault |
| 2003/0133551 A1 | 7/2003 | Kahn |
| 2003/0140352 A1 | 7/2003 | Kim |
| 2003/0201900 A1 | 10/2003 | Bachinski et al. |
| 2004/0019489 A1 | 1/2004 | Funk et al. |
| 2004/0036579 A1 | 2/2004 | Megerle |
| 2004/0117038 A1 | 6/2004 | Karaoguz et al. |
| 2004/0117843 A1 | 6/2004 | Karaoguz et al. |
| 2004/0121725 A1 | 6/2004 | Matsui |
| 2004/0128034 A1 | 7/2004 | Lenker et al. |
| 2004/0143838 A1 | 7/2004 | Rose |
| 2004/0148419 A1 | 7/2004 | Chen et al. |
| 2004/0148632 A1 | 7/2004 | Park et al. |
| 2004/0260407 A1 | 12/2004 | Wimsatt |
| 2004/0266419 A1 | 12/2004 | Arling et al. |
| 2005/0038875 A1 | 2/2005 | Park |
| 2005/0049862 A1 | 3/2005 | Choi et al. |
| 2005/0106267 A1 | 5/2005 | Frykman et al. |
| 2005/0159823 A1 | 7/2005 | Hayes et al. |
| 2005/0188315 A1 | 8/2005 | Campbell et al. |
| 2005/0200478 A1 | 9/2005 | Koch et al. |
| 2005/0243867 A1* | 11/2005 | Petite ............... G01V 1/364 370/474 |
| 2005/0245292 A1 | 11/2005 | Bennett et al. |
| 2005/0252622 A1 | 11/2005 | Reid |
| 2005/0264698 A1 | 12/2005 | Eshleman |
| 2005/0289614 A1 | 12/2005 | Baek et al. |
| 2006/0011145 A1 | 1/2006 | Kates |
| 2006/0059977 A1 | 3/2006 | Kates |
| 2006/0087428 A1 | 4/2006 | Wolfe et al. |
| 2006/0136968 A1 | 6/2006 | Han et al. |
| 2006/0143679 A1 | 6/2006 | Yamada et al. |
| 2006/0155389 A1 | 7/2006 | Pessolano et al. |
| 2006/0192680 A1 | 8/2006 | Scuka et al. |
| 2006/0244624 A1 | 11/2006 | Wang et al. |
| 2006/0253894 A1 | 11/2006 | Bookman et al. |
| 2007/0044119 A1 | 2/2007 | Sullivan et al. |
| 2007/0078910 A1 | 4/2007 | Bopardikar |
| 2007/0129220 A1 | 6/2007 | Bardha |
| 2007/0135225 A1 | 6/2007 | Nieminen et al. |
| 2007/0142022 A1 | 6/2007 | Madonna et al. |
| 2007/0146545 A1 | 6/2007 | Iwahashi |
| 2007/0150460 A1 | 6/2007 | Evans |
| 2007/0157258 A1 | 7/2007 | Jung et al. |
| 2007/0192486 A1 | 8/2007 | Wilson et al. |
| 2007/0194922 A1 | 8/2007 | Nathan et al. |
| 2007/0256085 A1 | 11/2007 | Reckamp et al. |
| 2007/0271518 A1 | 11/2007 | Tischer et al. |
| 2007/0275670 A1 | 11/2007 | Chen et al. |
| 2007/0279244 A1 | 12/2007 | Haughawout et al. |
| 2007/0280504 A1 | 12/2007 | Badawy et al. |
| 2008/0019392 A1 | 1/2008 | Lee |
| 2008/0021971 A1 | 1/2008 | Halgas |
| 2008/0022322 A1 | 1/2008 | Grannan et al. |
| 2008/0046930 A1 | 2/2008 | Smith et al. |
| 2008/0062258 A1 | 3/2008 | Bentkovski et al. |
| 2008/0062965 A1 | 3/2008 | Silva et al. |
| 2008/0092199 A1 | 4/2008 | McCarthy et al. |
| 2008/0109095 A1 | 5/2008 | Braithwaite et al. |
| 2008/0114963 A1 | 5/2008 | Cannon et al. |
| 2008/0120639 A1 | 5/2008 | Walter et al. |
| 2008/0123825 A1 | 5/2008 | Abramson et al. |
| 2008/0140736 A1 | 6/2008 | Jarno |
| 2008/0144884 A1 | 6/2008 | Habibi |
| 2008/0163330 A1 | 7/2008 | Sparrell |
| 2008/0236214 A1 | 10/2008 | Han |
| 2008/0278635 A1 | 11/2008 | Hardacker et al. |
| 2008/0284905 A1 | 11/2008 | Chuang |
| 2008/0288876 A1 | 11/2008 | Fleming |
| 2008/0297660 A1 | 12/2008 | Shioya |
| 2009/0023554 A1 | 1/2009 | Shim |
| 2009/0027225 A1 | 1/2009 | Farley |
| 2009/0033505 A1 | 2/2009 | Jones et al. |
| 2009/0040013 A1 | 2/2009 | Ebrom et al. |
| 2009/0066320 A1 | 3/2009 | Posey |
| 2009/0069038 A1 | 3/2009 | Olague et al. |
| 2009/0083374 A1 | 3/2009 | Saint Clair |
| 2009/0112541 A1 | 4/2009 | Anderson et al. |
| 2009/0138507 A1 | 5/2009 | Burckart et al. |
| 2009/0146834 A1 | 6/2009 | Huang |
| 2009/0165069 A1 | 6/2009 | Kirchner |
| 2009/0167555 A1 | 7/2009 | Kohanek |
| 2009/0190040 A1 | 7/2009 | Watanabe et al. |
| 2009/0235992 A1 | 9/2009 | Armstrong |
| 2009/0249428 A1 | 10/2009 | White et al. |
| 2009/0270065 A1 | 10/2009 | Hamada et al. |
| 2009/0271203 A1 | 10/2009 | Resch et al. |
| 2009/0286654 A1 | 11/2009 | Rice |
| 2009/0307715 A1 | 12/2009 | Santamaria et al. |
| 2010/0031286 A1 | 2/2010 | Gupta et al. |
| 2010/0045471 A1 | 2/2010 | Meyers |
| 2010/0046918 A1 | 2/2010 | Takao et al. |
| 2010/0083371 A1 | 4/2010 | Bennetts et al. |
| 2010/0097225 A1 | 4/2010 | Petricoin, Jr. |
| 2010/0102082 A1 | 4/2010 | Ebrom et al. |
| 2010/0122284 A1 | 5/2010 | Yoon et al. |
| 2010/0131280 A1 | 5/2010 | Bogineni |
| 2010/0138007 A1 | 6/2010 | Clark et al. |
| 2010/0138858 A1 | 6/2010 | Velazquez et al. |
| 2010/0146445 A1 | 6/2010 | Kraut |
| 2010/0161082 A1 | 6/2010 | Ebrom et al. |
| 2010/0164732 A1 | 7/2010 | Wedig et al. |
| 2010/0211546 A1 | 8/2010 | Grohman et al. |
| 2010/0277300 A1 | 11/2010 | Cohn et al. |
| 2010/0283579 A1 | 11/2010 | Kraus et al. |
| 2010/0309004 A1 | 12/2010 | Grundler et al. |
| 2010/0321151 A1 | 12/2010 | Matsuura et al. |
| 2011/0003665 A1 | 1/2011 | Burton et al. |
| 2011/0018693 A1 | 1/2011 | Lim et al. |
| 2011/0030016 A1 | 2/2011 | Pino et al. |
| 2011/0032423 A1* | 2/2011 | Jing ............... H04L 12/282 348/552 |
| 2011/0093126 A1 | 4/2011 | Toba et al. |
| 2011/0119325 A1 | 5/2011 | Paul et al. |
| 2011/0139076 A1 | 6/2011 | Pu et al. |
| 2011/0140832 A1 | 6/2011 | Vinkenvleugel et al. |
| 2011/0150432 A1 | 6/2011 | Paul et al. |
| 2011/0156862 A1 | 6/2011 | Langer |
| 2011/0157468 A1 | 6/2011 | Dai |
| 2011/0167250 A1* | 7/2011 | Dicks ............... A61B 5/1112 713/2 |
| 2011/0187928 A1 | 8/2011 | Crabtree |
| 2011/0187930 A1 | 8/2011 | Crabtree |
| 2011/0187931 A1 | 8/2011 | Kim |
| 2011/0202956 A1 | 8/2011 | Connelly et al. |
| 2011/0267180 A1 | 11/2011 | Ferringo et al. |
| 2011/0270549 A1 | 11/2011 | Jeansonne et al. |
| 2011/0282837 A1 | 11/2011 | Gounares et al. |
| 2011/0283311 A1 | 11/2011 | Luong |
| 2011/0285528 A1* | 11/2011 | Weinstein ............... E05B 19/22 340/539.11 |
| 2011/0295396 A1 | 12/2011 | Chinen et al. |
| 2011/0296463 A1 | 12/2011 | Suslov |
| 2012/0019388 A1 | 1/2012 | Kates |
| 2012/0047083 A1 | 2/2012 | Qiao et al. |

(56) References Cited

U.S. PATENT DOCUMENTS

| | | |
|---|---|---|
| 2012/0047532 A1 | 2/2012 | McCarthy |
| 2012/0059495 A1 | 3/2012 | Weiss et al. |
| 2012/0069246 A1 | 3/2012 | Thornberry et al. |
| 2012/0092183 A1 | 4/2012 | Corbett et al. |
| 2012/0094696 A1 | 4/2012 | Ahn et al. |
| 2012/0105724 A1 | 5/2012 | Candelore |
| 2012/0124245 A1 | 5/2012 | Reeves et al. |
| 2012/0124456 A1 | 5/2012 | Perez et al. |
| 2012/0154108 A1 | 6/2012 | Sugaya |
| 2012/0154138 A1* | 6/2012 | Cohn .................. G08B 25/004 340/501 |
| 2012/0164975 A1 | 6/2012 | Dodeja et al. |
| 2012/0167646 A1 | 7/2012 | Sharma et al. |
| 2012/0226366 A1 | 9/2012 | Lee et al. |
| 2012/0226768 A1* | 9/2012 | Gaines ................ G06F 19/3418 709/217 |
| 2012/0271472 A1 | 10/2012 | Brunner et al. |
| 2012/0271670 A1 | 10/2012 | Zaloom |
| 2012/0280802 A1 | 11/2012 | Yoshida et al. |
| 2012/0291068 A1 | 11/2012 | Khushoo et al. |
| 2012/0314713 A1 | 12/2012 | Singh et al. |
| 2012/0316876 A1 | 12/2012 | Jang et al. |
| 2012/0326835 A1 | 12/2012 | Cockrell et al. |
| 2013/0006400 A1 | 1/2013 | Caceres et al. |
| 2013/0013106 A1 | 1/2013 | Carelli et al. |
| 2013/0031037 A1* | 1/2013 | Brandt ................ H04L 63/1408 706/12 |
| 2013/0046800 A1 | 2/2013 | Assi et al. |
| 2013/0049950 A1 | 2/2013 | Wohlert |
| 2013/0053063 A1 | 2/2013 | McSheffrey |
| 2013/0060358 A1 | 3/2013 | Li et al. |
| 2013/0070044 A1 | 3/2013 | Naidoo et al. |
| 2013/0074061 A1 | 3/2013 | Averbuch et al. |
| 2013/0090213 A1 | 4/2013 | Amini et al. |
| 2013/0120137 A1 | 5/2013 | Lehmann |
| 2013/0124192 A1 | 5/2013 | Lindmark et al. |
| 2013/0138757 A1 | 5/2013 | Ferron |
| 2013/0147604 A1 | 6/2013 | Jones et al. |
| 2013/0152139 A1 | 6/2013 | Davis et al. |
| 2013/0158717 A1 | 6/2013 | Zywicki et al. |
| 2013/0179926 A1 | 7/2013 | White et al. |
| 2013/0185750 A1 | 7/2013 | Ayoub |
| 2013/0204408 A1 | 8/2013 | Thiruvengada et al. |
| 2013/0219482 A1* | 8/2013 | Brandt .................. H04L 65/607 726/9 |
| 2013/0238326 A1 | 9/2013 | Kim et al. |
| 2013/0247117 A1 | 9/2013 | Yamada et al. |
| 2013/0267383 A1 | 10/2013 | Watterson |
| 2013/0278828 A1 | 10/2013 | Todd |
| 2013/0289788 A1 | 10/2013 | Gupta et al. |
| 2013/0300576 A1 | 11/2013 | Sinsuan et al. |
| 2013/0318559 A1 | 11/2013 | Crabtree |
| 2013/0321637 A1 | 12/2013 | Frank et al. |
| 2013/0324247 A1 | 12/2013 | Esaki et al. |
| 2014/0025798 A1 | 1/2014 | Apte et al. |
| 2014/0028546 A1 | 1/2014 | Jeon et al. |
| 2014/0070959 A1 | 3/2014 | Bhargava et al. |
| 2014/0089671 A1 | 3/2014 | Logue et al. |
| 2014/0095684 A1 | 4/2014 | Nonaka et al. |
| 2014/0101465 A1 | 4/2014 | Wang et al. |
| 2014/0135993 A1 | 5/2014 | Kang et al. |
| 2014/0142724 A1 | 5/2014 | Park et al. |
| 2014/0160360 A1 | 6/2014 | Hsu et al. |
| 2014/0167969 A1 | 6/2014 | Wedig et al. |
| 2014/0168277 A1 | 6/2014 | Ashley et al. |
| 2014/0192197 A1 | 7/2014 | Hanko et al. |
| 2014/0192997 A1 | 7/2014 | Niu et al. |
| 2014/0201315 A1 | 7/2014 | Jacob et al. |
| 2014/0215505 A1 | 7/2014 | Balasubramanian et al. |
| 2014/0217905 A1 | 8/2014 | Clayton et al. |
| 2014/0218517 A1 | 8/2014 | Kim et al. |
| 2014/0222634 A1 | 8/2014 | Gordon et al. |
| 2014/0223548 A1 | 8/2014 | Wassingbo |
| 2014/0266669 A1 | 9/2014 | Fadell et al. |
| 2014/0266684 A1 | 9/2014 | Poder et al. |
| 2014/0282653 A1 | 9/2014 | Ariantaj et al. |
| 2014/0310075 A1 | 10/2014 | Ricci |
| 2014/0313014 A1 | 10/2014 | Huh et al. |
| 2014/0333529 A1 | 11/2014 | Kim et al. |
| 2014/0351832 A1 | 11/2014 | Cho et al. |
| 2014/0362201 A1 | 12/2014 | Nguyen et al. |
| 2014/0373074 A1 | 12/2014 | Hwang et al. |
| 2015/0008846 A1 | 1/2015 | Chen et al. |
| 2015/0015401 A1 | 1/2015 | Wedig et al. |
| 2015/0029096 A1 | 1/2015 | Ishihara |
| 2015/0054910 A1 | 2/2015 | Offen et al. |
| 2015/0061859 A1 | 3/2015 | Matsuoka et al. |
| 2015/0066173 A1 | 3/2015 | Ellis et al. |
| 2015/0074259 A1* | 3/2015 | Ansari .................. H04L 67/02 709/224 |
| 2015/0082225 A1 | 3/2015 | Shearer |
| 2015/0084770 A1 | 3/2015 | Xiao et al. |
| 2015/0085184 A1 | 3/2015 | Vidal et al. |
| 2015/0097689 A1 | 4/2015 | Logue et al. |
| 2015/0100167 A1 | 4/2015 | Sloo et al. |
| 2015/0106866 A1 | 4/2015 | Fujita |
| 2015/0113571 A1 | 4/2015 | Cholas et al. |
| 2015/0116113 A1 | 4/2015 | Caine et al. |
| 2015/0127712 A1 | 5/2015 | Fadell et al. |
| 2015/0131500 A1 | 5/2015 | Xie et al. |
| 2015/0137967 A1 | 5/2015 | Wedig et al. |
| 2015/0142991 A1 | 5/2015 | Zaloom |
| 2015/0143406 A1 | 5/2015 | Cho et al. |
| 2015/0143408 A1 | 5/2015 | Sallas |
| 2015/0145643 A1 | 5/2015 | Fadell et al. |
| 2015/0154850 A1 | 6/2015 | Fadell et al. |
| 2015/0156030 A1 | 6/2015 | Fadell et al. |
| 2015/0156612 A1 | 6/2015 | Vemulapalli |
| 2015/0159401 A1 | 6/2015 | Patrick et al. |
| 2015/0160634 A1 | 6/2015 | Smith et al. |
| 2015/0160635 A1 | 6/2015 | Schofield et al. |
| 2015/0160636 A1 | 6/2015 | McCarthy et al. |
| 2015/0160663 A1 | 6/2015 | McCarthy et al. |
| 2015/0160935 A1 | 6/2015 | Nye |
| 2015/0161452 A1 | 6/2015 | McCarthy et al. |
| 2015/0161882 A1 | 6/2015 | Lett |
| 2015/0162006 A1 | 6/2015 | Kummer |
| 2015/0163411 A1 | 6/2015 | McCarthy, III et al. |
| 2015/0163412 A1 | 6/2015 | Holley et al. |
| 2015/0163535 A1 | 6/2015 | McCarthy et al. |
| 2015/0172742 A1 | 6/2015 | Richardson |
| 2015/0180708 A1 | 6/2015 | Jacob et al. |
| 2015/0192914 A1 | 7/2015 | Slupik |
| 2015/0198941 A1 | 7/2015 | Pederson |
| 2015/0241860 A1 | 8/2015 | Raid |
| 2015/0260424 A1 | 9/2015 | Fadell et al. |
| 2015/0281824 A1 | 10/2015 | Nguyen et al. |
| 2015/0309487 A1 | 10/2015 | Lyman |
| 2015/0325096 A1 | 11/2015 | Hatch |
| 2015/0334069 A1 | 11/2015 | Winston et al. |
| 2015/0341599 A1 | 11/2015 | Carey |
| 2015/0347910 A1 | 12/2015 | Fadell et al. |
| 2015/0365787 A1 | 12/2015 | Farrell |
| 2016/0029153 A1 | 1/2016 | Linn et al. |
| 2016/0047569 A1 | 2/2016 | Fadell et al. |
| 2016/0063854 A1 | 3/2016 | Burton et al. |
| 2016/0066046 A1 | 3/2016 | Mountain |
| 2016/0091471 A1 | 3/2016 | Benn |
| 2016/0098309 A1 | 4/2016 | Kim |
| 2016/0100696 A1 | 4/2016 | Palashewski et al. |
| 2016/0109864 A1 | 4/2016 | Lonn |
| 2016/0121161 A1 | 5/2016 | Mountain |
| 2016/0123741 A1 | 5/2016 | Mountain |
| 2016/0163168 A1 | 6/2016 | Brav et al. |
| 2016/0182249 A1 | 6/2016 | Lea |
| 2016/0191912 A1 | 6/2016 | Lea et al. |
| 2016/0191990 A1 | 6/2016 | McCarthy |
| 2016/0196731 A1 | 7/2016 | Aich et al. |
| 2016/0203700 A1 | 7/2016 | Bruhn et al. |
| 2016/0234034 A1 | 8/2016 | Mahar et al. |
| 2016/0256485 A1 | 9/2016 | Wager et al. |
| 2016/0260135 A1 | 9/2016 | Zomet et al. |
| 2016/0285644 A1 | 9/2016 | Lu et al. |
| 2016/0286327 A1 | 9/2016 | Marten |

(56) References Cited

U.S. PATENT DOCUMENTS

| | | | |
|---|---|---|---|
| 2016/0323548 | A1 | 11/2016 | Khot et al. |
| 2016/0334811 | A1 | 11/2016 | Marten |
| 2016/0335423 | A1 | 11/2016 | Beals |
| 2016/0338179 | A1 | 11/2016 | Aliakseyeu et al. |
| 2016/0342379 | A1 | 11/2016 | Keipert et al. |
| 2016/0366746 | A1 | 12/2016 | van de Ven et al. |
| 2017/0005822 | A1 | 1/2017 | Gao |
| 2017/0065433 | A1 | 1/2017 | Gould et al. |
| 2017/0041886 | A1 | 2/2017 | Baker et al. |
| 2017/0048476 | A1 | 2/2017 | Freiin von Kapri et al. |
| 2017/0051925 | A1 | 2/2017 | Stefanski et al. |
| 2017/0054615 | A1 | 2/2017 | Wilson |
| 2017/0082987 | A1 | 3/2017 | Reddy et al. |
| 2017/0127124 | A9 | 5/2017 | Wilson et al. |
| 2017/0146964 | A1 | 5/2017 | Beals |
| 2017/0168469 | A1 | 6/2017 | Marten et al. |
| 2017/0176961 | A1 | 6/2017 | Tirpak |
| 2017/0187993 | A1 | 6/2017 | Martch et al. |
| 2017/0191693 | A1 | 7/2017 | Bruhn et al. |
| 2017/0191695 | A1 | 7/2017 | Bruhn et al. |
| 2017/0195130 | A1 | 7/2017 | Landow et al. |

FOREIGN PATENT DOCUMENTS

| | | |
|---|---|---|
| EP | 2 736 027 A1 | 5/2014 |
| EP | 3 080 677 A1 | 10/2016 |
| EP | 3 080 710 A1 | 10/2016 |
| GB | 2 304 952 A | 3/1997 |
| WO | 93/20544 A1 | 10/1993 |
| WO | 2004/068386 A1 | 8/2004 |
| WO | 2011/095567 A1 | 8/2011 |
| WO | 2014/068556 A1 | 5/2014 |
| WO | 2015/179120 A1 | 11/2015 |
| WO | 2016/034880 A1 | 3/2016 |
| WO | 2016/066399 A1 | 5/2016 |
| WO | 2016/066442 A1 | 5/2016 |
| WO | 2016/182696 A1 | 11/2016 |
| WO | 2017/116533 A1 | 6/2017 |

OTHER PUBLICATIONS

International Search Report and Written Opinion for PCT/EP2015/073936 dated Feb. 4, 2016, all pages.
U.S. Appl. No. 14/485,188, filed Sep. 12, 2014, Final Rejection dated Feb. 23, 2016, 22 pages.
U.S. Appl. No. 14/567,348, filed Dec. 11, 2014, Preinterview first office action dated Jan. 20, 2016, 23 pages.
U.S. Appl. No. 14/470,352, filed Aug. 27, 2014 Final Office Action dated Mar. 17, 2016, all pages.
U.S. Appl. No. 14/567,765, filed Dec. 11, 2014, Preinterview first office action dated Apr. 8, 2016, 30 pages.
U.S. Appl. No. 14/577,717, filed Dec. 19, 2014, Preinterview first office action dated Apr. 4, 2016, 29 pages.
U.S. Appl. No. 14/584,075, filed Dec. 29, 2014, Non-Final Rejection dated Apr. 1, 2016, 40 pp.
Mexican Institute of Industrial Property Notice of Allowance dated Feb. 10, 2014, for Mex. Patent Appln No. MX/a/2012/008882, 1 page.
Mexican Institute of Industrial Property Office Action dated Nov. 1, 2013, for Mex. Patent Appln No. MX/a/2012/008882 is not translated into English, 3 pages.
U.S. Appl. No. 12/700,310, filed Feb. 4, 2010 Non-Final Office Action dated Mar. 11, 2015, 35 pages.
International Search Report and Written Opinion for PCT/US2016/028126 dated Jun. 3, 2016, all pages.
U.S. Appl. No. 12/700,310, filed Feb. 4, 2010 Non-Final Office Action dated Jun. 16, 2016, 30 pages.
U.S. Appl. No. 14/528,739, filed Oct. 30, 2014 Notice of Allowance dated Jun. 23, 2016, 34 pages.
U.S. Appl. No. 14/485,188, filed Sep. 12, 2014, Non-Final Rejection dated Jun. 17, 2016, 29 pages.
U.S. Appl. No. 14/710,331, filed May 12, 2015, Non-Final Rejection dated May 20, 2016, 42 pages.
International Preliminary Report on Patentability for PCT/US2014/055441 dated Jun. 14, 2016, 8 pages.
International Preliminary Report on Patentability for PCT/US2014/053876 dated Jun. 14, 2016, 7 pages.
International Preliminary Report on Patentability for PCT/US2014/055476 dated Jun. 14, 2016, 9 pages.
U.S. Appl. No. 14/107,132, filed Dec. 16, 2013 Non Final Office Action dated May 27, 2015, 26 pages.
U.S. Appl. No. 14/470,352, filed Aug. 27, 2014 Non Final Office Action dated Aug. 26, 2016, all pages.
U.S. Appl. No. 14/107,132, filed Dec. 16, 2013, Non Final Office Action dated Jul. 18, 2016, all pages.
U.S. Appl. No. 14/715,248, filed May 18, 2015, Non-Final Rejection dated Jul. 19, 2016, 34 pages.
U.S. Appl. No. 14/567,783, filed Dec. 11, 2014, Non Final Rejection dated Aug. 23, 2016, all pages.
U.S. Appl. No. 14/485,188, filed Sep. 12, 2014, Pre-Interview First Office Action dated Jul. 29, 2015, 20 pages.
U.S. Appl. No. 14/485,188, filed Sep. 12, 2014, Pre-Interview First Office Action dated Oct. 1, 2015, 10 pages.
U.S. Appl. No. 12/700,310, filed Feb. 4, 2010 Notice of Allowance dated Nov. 8, 2016, all pages.
U.S. Appl. No. 14/567,765, filed Dec. 11, 2014, First Action interview dated Oct. 18, 2016, all pages.
U.S. Appl. No. 14/584,075, filed Dec. 29, 2014, Final Rejection dated Oct. 6, 2016, all pages.
U.S. Appl. No. 14/566,977, filed Dec. 11, 2014, Non Final Rejection dated Oct. 3, 2016, all pages.
U.S. Appl. No. 14/567,754, filed Dec. 11, 2014, Non Final Rejection dated Nov. 4, 2016, all pages.
U.S. Appl. No. 14/567,770, filed Dec. 11, 2014, Non Final Rejection dated Nov. 4, 2016, all pages.
U.S. Appl. No. 14/671,299, filed Mar. 27, 2015, Non Final Rejection dated Oct. 28, 2016, all pages.
U.S. Appl. No. 14/476,377, filed Sep. 3, 2014, Non-Final Rejection dated Nov. 7, 2016, all pages.
Office Action for EP14868928.4 dated Sep. 23, 2016, all pages.
Author Unknown, "AllJoyn Onboarding Service Frameworks," Qualcomm Connected Experiences, Inc., ac cessed on Jul. 15, 2014, 9 pages. Retrieved from https://www.alljoyn.org.
Author Unknown, "App for Samsung Smart TV®," Crestron Electronics, Inc., accessed on Jul. 14, 2014, 3 pages. Retrieved from http://www.crestron.com/products/smart tv television apps/.
Author Unknown, "International Building Code Excerpts, Updated with recent code changes that impact electromagnetic locks," Securitron, Assa Abloy, 2007, 2009,2 pages.Retrieved from: www.securitron.com/Other/.../New_IBC-IFC_Code_Language.pdf.
Author Unknown, "Voice Activated TV using the Amulet Remote for Media Center," AmuletDevices.com, accessed on Jul. 14, 2014, 1 page. Retrieved from http://www.amuletdevices.com/index.php/Features/television.html.
International Search Report and Written Opinion of PCT/EP2011/051608 dated May 30, 2011, 11 pages.
International Preliminary Report on Patentability for PCT/EP2011/051608 dated Aug. 16, 2012, 8 pages.
International Search Report and Written Opinion of PCT/US2014/053876 dated Nov. 26, 2014, 9 pages.
Lamonica, M., "CES 2010 Preview: Green comes in many colors," retrieved from CNET.com (http://ces.cnet.com/8301-31045_1-10420381-269.html), Dec. 22, 2009, 2 pages.
Mexican Institute of Industrial Property Office Action dated Dec. 16, 2013, for Mex. Patent Appln No. MX/a/2012/008882, 3 pages.
Robbins, Gordon, Deputy Chief, "Addison Fire Department Access Control Installation," 2006 International Fire Code, Section 1008.1.3.4, 4 pages.
U.S. Appl. No. 12/700,310, filed Feb. 4, 2010 Non-Final Office Action dated Aug. 14, 2014, 18 pages.
U.S. Appl. No. 12/700,310, filed Feb. 4, 2010 Final Office Action dated Feb. 28, 2014, 17 pages.
U.S. Appl. No. 12/700,310, filed Feb. 4, 2010 Non-Final Office Action dated Oct. 15, 2013, 15 pages.

(56) References Cited

OTHER PUBLICATIONS

U.S. Appl. No. 12/700,310, filed Feb. 4, 2010 Non-Final Office Action dated Apr. 1, 2013, 16 pages.
U.S. Appl. No. 12/700,310, filed Feb. 4, 2010, Final Office Action dated Oct. 10, 2012, 16 pages.
U.S. Appl. No. 12/700,310, filed Feb. 4, 2010, Office Action dated May 4, 2012, 15 pages.
U.S. Appl. No. 12/700,408, filed Feb. 4, 2010, Notice of Allowance dated Jul. 28, 2012, 8 pages.
U.S. Appl. No. 13/680,934, filed Nov. 19, 2012, Notice of Allowance dated Jul. 25, 2014, 12 pages.
U.S. Appl. No. 13/680,934, filed Nov. 19, 2012, Notice of Allowance dated Apr. 30, 2014, 9 pages.
U.S. Appl. No. 13/680,934, filed Nov. 19, 2012, Final Office Action dated Feb. 10, 2014, 13 pages.
U.S. Appl. No. 13/680,934, filed Nov. 19, 2012, Non-Final Office Action dated Oct. 2, 2013, 7 pages.
Fong A.C.M. et al, "Indoor air quality control for asthma patients using smart home technology," Consumer Electronics (ISCE), 2011 IEEE 15th International Symposium on, IEEE, Jun. 14, 2011, pp. 18-19, XP032007803, DOI: 10.1109/ISCE.2011.5973774, ISBN: 978-1-61284-843-3, Abstract and sections 3 and 4.
Shunfeng Cheng et al., "A Wireless Sensor System for Prognostics and Health Management," IEEE Sensors Journal, IEEE Service Center, New York, NY, US, vol. 10, No. 4, Apr. 1, 2010, pp. 856-862, XP011304455, ISSN: 1530-437X, Sections 2 and 3.
International Search Report and Written Opinion for PCT/EP2015/070286 dated Nov. 5, 2015, 13 pages.
International Search Report and Written Opinion for PCT/GB2015/052544 dated Nov. 6, 2015, 10 pages.
U.S. Appl. No. 14/470,352, filed Aug. 27, 2014 Non Final Office Action dated Nov. 20, 2015, 28 pages.
International Search Report and Written Opinion for PCT/GB2015/052457 dated Nov. 13, 2015, 11 pages.
U.S. Appl. No. 12/700,310, filed Feb. 4, 2010 Final Office Action dated Oct. 26, 2015, 19 pages.
U.S. Appl. No. 14/107,132, filed Dec. 16, 2013, Final Rejection dated Dec. 16, 2015, 32 pages.
International Search Report and Written Opinion for PCT/US2014/055441 dated Dec. 4, 2014, 10 pages.
"Acoustic/Ultrasound Ultrasonic Flowmeter Basics," Questex Media Group LLC, accessed on Dec. 16, 2014, 4 pages. Retrieved from http://www.sensorsmag.com/sensors/acoustic-ultrasound/ultrasonic-flowmeter-basics-842.
"Do you want to know how to find water leaks? Use a Bravedo Water Alert Flow Monitor to find out!", Bravedo.com, accessed Dec. 16, 2014, 10 pages. Retrieved from http://bravedo.com/.
"Flow Pulse®, Non-invasive clamp-on flow monitor for pipes," Pulsar Process Measurement Ltd, accessed on Dec. 16, 2014, 2 pages.Retrieved from http://www.pulsar-pm.com/product-types/flow/flow-pulse.aspx.
"Introduction to Ultrasonic Doppler Flowmeters," OMEGA Engineering inc., accessed on Dec. 16, 2014, 3 pages. Retrieved from http://www.omega.com/prodinfo/ultrasonicflowmeters.html.
Wang et al., "Mixed Sound Event Verification on Wireless Sensor Network for Home Automation," IEEE Transactions on Industrial Informatics, vol. 10, No. 1, Feb. 2014, 10 pages.
International Search Report and Written Opinion for PCT/US2014/055476 dated Dec. 30, 2014, 10 pages.
U.S. Appl. No. 14/470,352, filed Aug. 27, 2014 Notice of Allowance dated Dec. 2, 2016, all pages.
U.S. Appl. No. 15/050,958, filed Feb. 23, 2016 Notice of Allowance dated Dec. 6, 2016, all pages.
U.S. Appl. No. 15/289,395, filed Oct. 10, 2016 Non-Final Rejection dated Dec. 2, 2016, all pages.
U.S. Appl. No. 14/107,132, filed Dec. 16, 2013, Notice of Allowance dated Jan. 18, 2017, all pages.
U.S. Appl. No. 14/485,188, filed Sep. 12, 2014, Final Rejection dated Nov. 25, 2016, 22 pages.
U.S. Appl. No. 14/577,717, filed Dec. 19, 2014, Final Office Action dated Dec. 19, 2016, all pages.
U.S. Appl. No. 14/567,783, filed Dec. 11, 2014, Final Rejection dated Dec. 20, 2016, all pages.
U.S. Appl. No. 15/075,412, filed Mar. 21, 2016, Non Final Rejection dated Dec. 21, 2016, all pages.
International Preliminary Report on Patentability for PCT/GB2015/052544 dated Mar. 7, 2017.
International Search Report and Written Opinion for PCT/US2016/057729 dated Mar. 28, 2017, all pages.
European Search Report for EP 16 20 0422 dated Jan. 13, 2017, all pages.
BDEJONG_CREE, "Cannot remove last user of a group even though members still exist," Microsoft Visual Studio forum site, Topic ID #58405, Response by Microsoft, Dec. 17, 2010) retrieved on Apr. 6, 2017 from: https://connect.microsoft.com/VisualStudio/feedback/details/580405/tfs-2010-cannont-remove-last-user-of-a-group-even-though-members-still-exists.
International Preliminary Report on Patentability for PCT/GB2015/052457 dated Feb. 28, 2017, all pages.
U.S. Appl. No. 14/485,188, filed Sep. 12, 2014, Non-Final Rejection dated Apr. 19, 2017, all pages.
U.S. Appl. No. 14/567,765, filed Dec. 11, 2014, Final Rejection dated Feb. 16, 2017, all pages.
U.S. Appl. No. 14/485,038, filed Sep. 12, 2014, Non Final Rejection dated Apr. 6, 2017, all pages.
U.S. Appl. No. 14/584,075, filed Dec. 29, 2014, Non-Final Rejection dated Mar. 10, 2017, all pages.
U.S. Appl. No. 14/710,331, filed May 12, 2015, Non-Final Rejection dated Mar. 10, 2017, all pages.
U.S. Appl. No. 14/566,977, filed Dec. 11, 2014, Final Rejection dated Feb. 10, 2017, all pages.
U.S. Appl. No. 14/671,299, filed Mar. 27, 2015, Notice of Allowance dated Apr. 17, 2017, all pages.
U.S. Appl. No. 14/565,853, filed Dec. 10, 2014, Non Final Rejection dated Mar. 10, 2017, all pages.
U.S. Appl. No. 15/075,412, filed Mar. 21, 2016, Final Rejection dated Apr. 17, 2017, all pages.
U.S. Appl. No. 14/497,130, filed Sep. 25, 2014, Non Final Rejection dated Feb. 8, 2017, all pages.
U.S. Appl. No. 14/528,402, filed Oct. 30, 2014, Non-Final Rejection dated Apr. 11, 2017, all pages.
U.S. Appl. No. 14/475,252, filed Sep. 2, 2014, Non-Final Rejection dated Apr. 12, 2017, all pages.
Notification of Publication of European Application No. 162004220 as EP 3166308 dated May 10, 2017, 2 pages.
U.S. Appl. No. 14/567,765, filed Dec. 11, 2014, Notice of Allowance dated May 24, 2017, all pages.
U.S. Appl. No. 14/567,754, filed Dec. 11, 2014, Final Rejection dated May 26, 2017, all pages.
U.S. Appl. No. 14/567,770, filed Dec. 11, 2014, Final Rejection dated Jun. 1, 2017, all pages.
U.S. Appl. No. 14/476,377, filed Sep. 3, 2014, Notice of Allowance dated May 19, 2017, all pages.
U.S. Appl. No. 14/832,821, filed Aug. 21, 2015, Non-Final Rejection dated Apr. 24, 2017, all pages.
U.S. Appl. No. 14/981,501, filed Dec. 28, 2015, Preinterview first office action dated Apr. 20, 2017, all pages.
U.S. Appl. No. 14/709,791, filed May 12, 2015, Non Final Rejection dated May 31, 2017, all pages.
U.S. Appl. No. 15/289,395, filed Oct. 10, 2016 Non-Final Rejection dated Jun. 19, 2017, all pages.
U.S. Appl. No. 14/497,130, filed Sep. 25, 2014, Final Rejection dated Aug. 4, 2017, all pages.
U.S. Appl. No. 14/981,501, filed Dec. 28, 2015, First Action Interview—office action dated Jul. 19, 2017, all pages.
U.S. Appl. No. 14/567,502, filed Dec. 11, 2014, Final Rejection dated Aug. 7, 2017, all pages.
Notification of Publication of European Application No. 15763643.2 as EP 3189511 dated Jul. 12, 2017, 1 page.
Notification of Publication of Brazilian Application No. BR 11 2016 0112032 dated Aug. 8, 2017, 2 pages.

(56) References Cited

OTHER PUBLICATIONS

Notification of Publication of Brazilian Application No. BR 11 2016 010376 9 dated Aug. 8, 2017, 1 page.
Supplementary European Search Report for EP 14868928 dated Jul. 7, 2017, 11 pages.
Supplementary European Search Report for EP 14870507 dated Jun. 28, 2017, all pages.
"Plug-In Carbon Monoxide & Natural Gas Alarm with Backup Battery Protection," Universal Security Instruments, Inc., 2011, 12 pages.
U.S. Appl. No. 14/584,075, filed Dec. 29, 2014, Final Rejection dated Sep. 9, 2017, all pages.
U.S. Appl. No. 14/952,580, filed Nov. 25, 2015, Non-Final Rejection dated Sep. 20, 2017, all pages.
U.S. Appl. No. 15/189,775, filed Jun. 22, 2016, Notice of Allowance dated Sep. 11, 2017, all pages.
U.S. Appl. No. 14/986,496, filed Dec. 31, 2015, Non-Final Rejection dated Sep. 26, 2017, all pages.
U.S. Appl. No. 14/710,331, filed May 12, 2015, Final Rejection dated Aug. 16, 2017, all pages.
U.S. Appl. No. 14/553,763, filed Nov. 25, 2014 Preinterview first office action dated Oct. 6, 2017, all pages.

\* cited by examiner

| Update Count | Device Identifier | Device Characteristic | Current Status |
|---|---|---|---|
| 9 | Refrigerator | Open/Closed | Closed |
| | | Refrig. Temperature | 35 |
| | | Freezer Temperature | 0 |
| | Doorbell | Pressed in last 5 min. | No |
| 2 | Security Camera | On/Off | Off |
| | | Recording | Yes |
| | | Streaming | No |
| | Light | On/Off | On |
| 5 | | Color | Green |
| | | Brightness | 50% |
| 1 | Door/Lock | Opened/Closed | Open |
| | | Locked/Unlocked | Locked |
| 11 | Window | Opened/Closed | Open |
| 10 | | Locked/Unlocked | Unlocked |
| 4 | Garage Door | Opened/Closed | Open |
| | Thermostat | Heat/Cool | Heat |
| | | Set Temperature | 67 |
| | | Fan On/Off | On |
| 12 | Devices in Model | | |

FIG. 3

|     | 210 | 220 | 230 | 240 |
|-----|---|---|---|---|
|     | Update Count | Device Identifier | Device Characteristic | Current Status |
| 305 | 9 | Refrigerator | Open/Closed | Closed |
|     |   |   | Refrig. Temperature | 35 |
|     |   |   | Freezer Temperature | 0 |
|     |   | Doorbell | Pressed in last 5 min. | No |
|     | 2 | Security Camera | On/Off | Off |
|     |   |   | Recording | Yes |
|     |   |   | Streaming | No |
|     |   | Light | On/Off | On |
|     | 5 |   | Color | Green |
|     |   |   | Brightness | 50% |
|     | 1 | Door/Lock | Opened/Closed | Open |
|     |   |   | Locked/Unlocked | Locked |
| 307 | 11 | Window | Opened/Closed | Open |
| 306 | 10 |   | Locked/Unlocked | Unlocked |
|     | 4 | Garage Door | Opened/Closed | Open |
|     |   | Thermostat | Heat/Cool | Heat |
|     |   |   | Set Temperature | 67 |
|     |   |   | Fan On/Off | On |
| 308 | 12 | Devices in Model |   |   |

Home Automation Model
Identifier Count = 6

FIG. 4

MAINTAINING UP-TO-DATE HOME AUTOMATION MODELS

CROSS REFERENCE TO RELATED APPLICATION

This application claims priority to U.S. Provisional Application 61/914,856, filed Dec. 11, 2013, entitled "Methods and Systems for Home Automation," the entire disclosure of which is hereby incorporated by reference for all purposes.

BACKGROUND

Home automation systems are becoming increasingly prevalent. Such systems typically allow the integration of multiple "smart" home devices that allow one or more users to remotely control and/or view status information for the smart home devices. A user may wish to view statuses and/or interact with home automation devices from a remote device, such as a mobile phone or tablet computer. To do so, information relevant to the home automation system may need to be transmitted to the remote device being used by the user.

SUMMARY

Various arrangements for maintaining an up-to-date home automation model is presented. Such arrangements may be implemented using methods, computerized systems, devices, television receivers, and computer-readable mediums that include instructions executed by one or more processors. Maintaining an up-to-date home automation model may include receiving a first status update of a home automation device installed as part of a home automation system in a home, the home automation system comprising a plurality of home automation devices. An entry of a plurality of entries in a master home automation model may be updated based on the first status update of the home automation device. The master home automation model may be maintained by the home automation host system. The plurality of entries may correspond to home automation device characteristics of the plurality of home automation devices. A numerical identifier may be incremented, this identifier may be used to track status updates related to the home automation system in the home. Within the master home automation model, the incremented numerical identifier may be assigned to the updated entry in the master home automation model.

Embodiments of such an arrangement may include one or more of the following features: A request may be received from a remote device for an update to a remotely-stored home automation model of the home automation system. The remotely-stored home automation model may be stored by the remote device remotely from the master home automation model stored by the home automation host system. The request may indicate a most-recent numerical identifier stored by the remote device. The most-recent numerical identifier received from the remote device may be compared with the numerical identifier of the master home automation model maintained by the home automation host system. Information from the entry of the plurality of entries of the master home automation model may be determined to be transmitted to the remote device based on comparing the most-recent numerical identifier received from the remote device with the numerical identifier of the master home automation model maintained by the home automation host system. The information from the entry of plurality of entries of the master home automation model may be caused to be transmitted to the remote device based on comparing the most-recent numerical identifier received from the remote device with the numerical identifier of the master home automation model maintained by the home automation host system, the information being indicative of the first status update. Prior to receiving the first status update, a second status update of the home automation device installed as part of the home automation system in the home may be received. The entry of the plurality of entries in the master home automation model may be updated based on the second status update of the home automation device, wherein the second status update is subsequently overwritten by the first status update and no request for the update to the remotely-stored home automation model is received from the remote device between updating the entry based on the second status update and updating the entry based on the first status update.

Additionally or alternatively, embodiments of such an arrangement may include one or more of the following features: No information indicative of the second status update may be transmitted to the remote device. A system may include a home automation device and a remote device, wherein the remote device is a wireless device that only intermittently updates the remotely-stored home automation model. A master checksum value may be calculated based on the master home automation model. The master checksum value may be transmitted to the remote device. A remote checksum value may be calculated based on the remotely-stored home automation model. The master checksum value received from the home automation host system may be compared with the calculated remote checksum value. A rebuild of the remotely-stored home automation model may be requested based on comparing the master checksum value with the calculated remote checksum value. In some embodiments, the home automation host system is a television receiver, comprising multiple tuners configured to receive broadcast television channels.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 3 illustrates an embodiment of a home automation model database that has been updated due to events occurring within the home automation system.

FIG. 4 illustrates an embodiment of a home automation model database that has been updated due to events occurring within the home automation system and is used to update a remote device that has an out-of-date home automation model.

DETAILED DESCRIPTION

Figure 1:
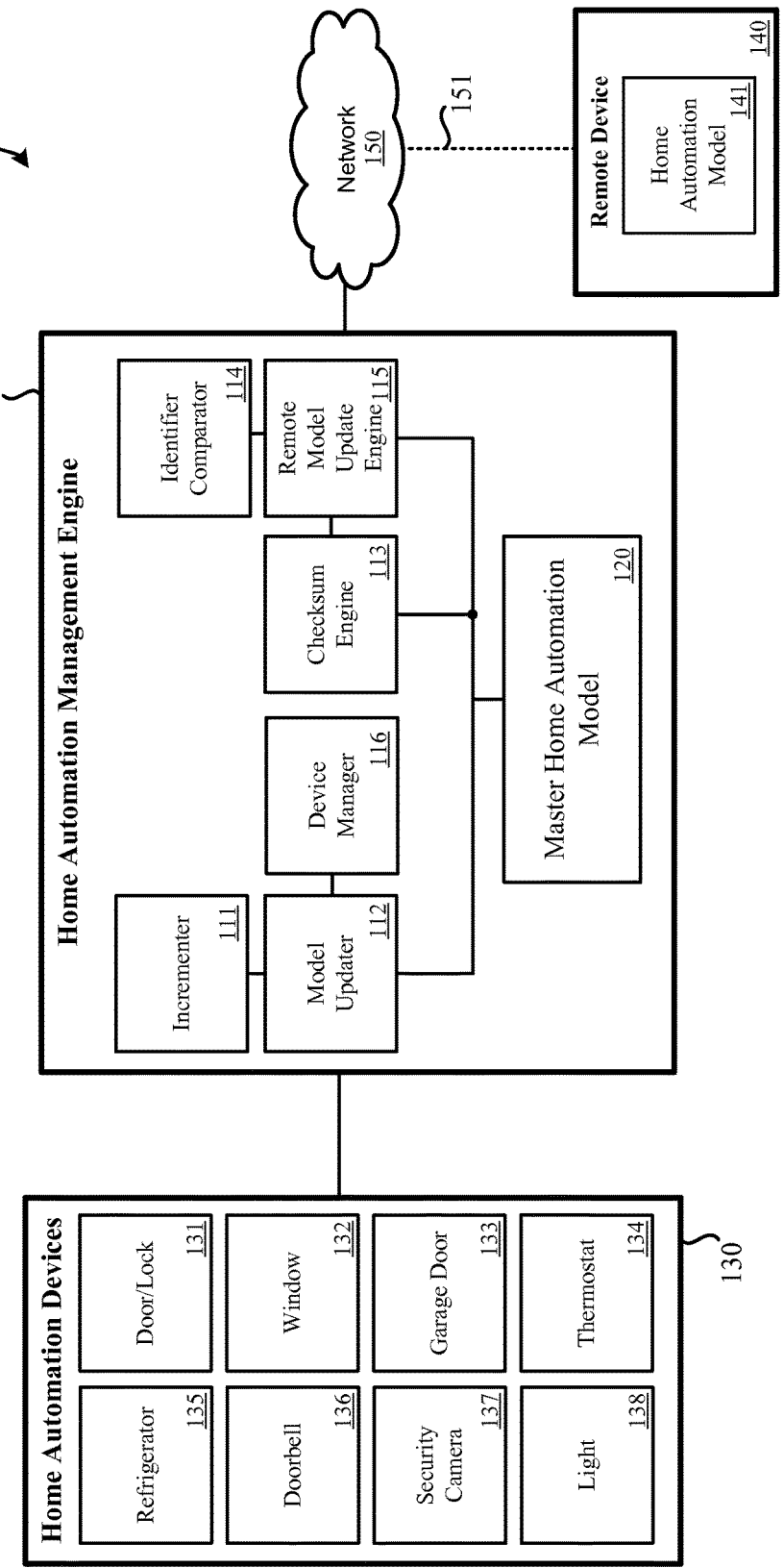
FIG. 1 illustrates an embodiment of a home automation system.

A home automation system may include multiple home automation devices installed within a home (or other form of structure, such as an office building, warehouse, etc.). Such home automation devices may be configured to communicate via a wired or wireless communication protocol with a home automation host. The home automation host may serve to provide commands to home automation devices and receive status updates from such home automation devices. For example, a home automation device may be a "smart" light. The light may be turned on or off by the home automation host. Further, the home automation host may receive status updates from the light, such as information indicative of whether the light is currently turned on or off, its current brightness level, and its current illuminated color. The home automation host may maintain a master home automation model that is indicative of the current statuses of the characteristics of home automation devices installed within the home automation system. By consulting the master home automation model, the current status of the home automation devices of a home automation system can be ascertained.

In many situations, a user may desire to review the current statuses of home automation devices within the home automation system. To view the statuses, the user may use a remote device to access the home automation host. For instance, the user may use a tablet computer that has an application installed that allows the user to view statuses of devices within the home automation system by acquiring such information from the home automation host. As another example, while away from home, a user may use a mobile device, such as a cellular phone, to learn the status of various home automation devices installed within the home. In order for the user to use such a remote device to learn the statuses of home automation devices within the home automation system, status information needs to be transferred from the home automation host to the remote device.

It may be desirable to minimize, or at least decrease, the amount of information needed to be transmitted to the remote device by the home automation host necessary to provide the user with up-to-date statuses of the home automation devices. That is, it may not be desirable for the home automation system to transmit a current status of every characteristic of every home automation device within the home automation system whenever a user desires to review such statuses. By minimizing, or at least decreasing, the amount of status information transmitted to the remote device, the amount of time needed for the remote device to become synchronized with the home automation model maintained by the home automation host may be decreased.

While the home automation host may maintain the master home automation model, one or more remote devices that interact with the home automation host may maintain their own home automation models of the home automation system. The home automation models maintained by such remote devices may not reflect the most recent statuses of characteristics of home automation devices of the home automation system if the remote device has not recently synchronized with the home automation host. For instance, a tablet computer that is disconnected from all networks may have its home automation model become unsynchronized with the master home automation model while the tablet computer is unable to communicate with the home automation host. As such, prior to a user viewing or otherwise interacting with a home automation model stored by a remote device, the home automation model may need to be synchronized with the master home automation model maintained by the home automation host such that the statuses of the home automation devices are current.

Such synchronization between the home automation model maintained by the remote device and the master home automation host may be performed in such a way as to minimize, or at least decrease, the amount of data necessary to transfer from the home automation host to the remote device to bring the remote device's home automation model into synchronization with the master home automation model. The home automation host may maintain the master home automation model (such as in the form of a database, table, tree structure, or other data storage arrangement) indicative of the various statutes of device characteristics of home automation devices within the home automation system. Whenever the home automation host determines that a status of a device characteristic of a home automation device changes, the home automation host records the change to the master home automation model in relation to the device's characteristic. Therefore, an entry corresponding to the characteristic may be updated to indicate the current, up-to-date status. In association with the characteristic, an identifier, such as a numerical identifier, may be stored to the master home automation model. This identifier may overwrite or otherwise displace a previous identifier associated with the last time that particular characteristic was updated within the master home automation model. This numerical identifier may increment for each change recorded to the master home automation model. As changes are recorded to the master home automation model, subsequent numerical identifiers may be also stored in relation with such changes, with such identifiers being incremented. By comparing the numerical identifier associated with the most recent change at the master home automation model and a numerical identifier of a most recent change used to update a home automation model maintained by a remote device, it can be determined which device characteristics have statuses that need to be updated in the remote device's home automation model. In some embodiments, an aspect is that because previous updates are overwritten in the master home automation model, thus only the most recent update to a device characteristic is sent to the remote device. For instance, if since the last time a remote device's home automation model was updated, a particular light switched its status from on to off and off to on fifty times, only the most recent status would be sent to the remote device. For devices that have not had their statuses changed since the last time the remote device's home automation model were updated, no updates may be sent to the remote device. Such concepts are detailed further in relation to the figures.

FIG. 1 illustrates an embodiment of a home automation system 100. Home automation system 100 may include home automation management engine 110, home automation devices 130, remote device 140, and network 150. Home automation management engine 110 includes multiple modules, that include: incrementer 111, model updater 112, device manager 116, checksum engine 113, identifier comparator 114, remote model update engine 115, and master home automation model 120. Such modules may be implemented using hardware, firmware, and/or software that is executed by underlying computer hardware. Home automation management engine 110 may be part of a home automation host. For example, a home computer system or television receiver may function as a home automation host by having an incorporated home automation management engine that maintains a home automation model and response to requests from one or more remote devices.

Various home automation devices 130 may be present and installed in a home automation system within a home (or other form of structure). By way of example, home automation devices 130 can include: door/lock 131, window 132, garage door 133, thermostat 134, refrigerator 135, doorbell 136, security camera 137, and light 138. In various embodiments, various subsets of such home automation devices may be installed within home automation system and/or other home automation devices may be installed within the home automation system. Further, it should be understood that multiple instances of any of home automation devices 130 may be installed within the home automation system present in the home. For instance, home automation devices 130 may include multiple instances of light 138.

Each of home automation devices 130 may be configured to communicate with home automation management engine 110. Home automation devices 130 may be configured to receive commands from home automation management engine 110 and/or provide statuses to home automation management engine 110. Each home automation device of home automation devices 130 may be associated with one or more device characteristics. For example, light 138 may have a single device characteristic: a power characteristic (on or off). Alternatively, a home automation device such as light 138 may have multiple device characteristics, such as: power, brightness, and color. The number of device characteristics associated with each home automation device of home automation devices 130 may be dependent on the type, make, and model of the individual home automation device. Further, the particular device characteristics of a home automation device of home automation devices 130 may vary based on the type of home automation device. For example, refrigerator 135 may have different device characteristics from garage door 133. Home automation devices 130 may individually communicate with home automation management engine 110 either directly (e.g., via a direct wireless protocol, such as Bluetooth® or WiFi Direct®) or via a wireless network (e.g., an ad hoc network, an IEEE 802.15-based network, Zigbee®, etc.). Home automation devices 130 may periodically transmit statuses of various device characteristics or may provide such statuses of device characteristics in response to requests received from home automation management engine 110. Further, at least some of home automation devices 130 may be configured to respond to commands from home automation management engine 110. For example, home automation management engine 110 may be configured to send a command to door/lock 131 that engages the lock. As home automation devices are added to home automation devices 130, home automation management engine 110 may be configured to communicate with, receive status updates from, and send commands to such home automation devices.

Home automation management engine 110 may include model updater 112. Model updater 112 may be in communication with one or more home automation devices installed within a home automation system present in the house. Model updater 112 may be configured to receive status updates from home automation devices 130 and/or commands from home automation management engine 110 that are being transmitted to home automation devices 130 that affect the status of such home automation devices. For example, model updater 112 may receive a message from light 138 that indicates that light 138 has a color device characteristic of "red" for the current color being used to illuminate. As another example, model updater 112 may receive a message from device manager 116 indicating that a command is being sent to light 138 indicative of the device characteristic of color being set to red. As such, model updater 112 receives the current statuses of home automation devices 130. Model updater 112 may use the current statuses of various characteristics for home automation devices 130 to maintain master home automation model 120. As such, information stored to master home automation model 120 is indicative of the current statuses of each home automation device's characteristics. Further detail regarding master home automation model 120 is provided in relation to FIG. 2.

Incrementer 111 may be used to track updates performed by model updater 112 to master home automation model 120. Each time an update is to be made to home automation model database by model updater 112, incrementer 111 may be incremented (whether incrementer 111 is incremented before or after an update may vary by embodiment). Therefore, incrementer 111 may provide model updater 112 within incremented numerical value for each update to be made to master home automation model 120. In association with each update made to master home automation model 120, model updater 112 may store the incremented numerical value received from incrementer 111. As a simple example, for a first update made to master home automation model 120, a numerical value of "1" may be generated by incrementer 111 and stored in association with the device characteristic in master home automation model 120 that was updated; for a second update made to master home automation model 120, a numerical value of "2" may be generated and output by incrementer 111 and stored in association with the device characteristic in master home automation model 120 that was updated; and for a third update made to master home automation model 120, a numerical value of "3" may be generated and output by incrementer 111 and stored in association with the device characteristic in master home automation model 120 that was updated (and so on). If the same device characteristic is updated multiple times, the device characteristic in the master home automation model 120 may be updated and the associated numerical value stored to the master home automation model 120 may receive only the most recent assigned numerical value.

Device manager 116 may be configured to send commands to home automation devices 130. Device manager 116 may send such commands based on rules or other settings maintained by home automation management engine 110. Device manager 116 may also send commands to home automation devices 130 in response to requests received from a user, which may have been made either directly to home automation management engine 110 or from a remote device, such as remote device 140.

Remote device 140 may represent a remote device through which a user desires to view statuses of home automation devices 130. Remote device 140 may be a remote computer system, a cellular phone, a tablet computer, laptop, or any other computerized device through which a user desires to interact with home automation management engine 110. Remote device 140 may use wireless communication to communicate with a network, such as network 150. It should be understood that in other embodiments, multiple remote devices may maintain home automation models similar to how remote device 140 maintains home automation model 141. Separate from master home automation model 120, remote device 140 may maintain home automation model 141. Ideally, home automation model 141 may stay synchronized with master home automation model 120. Home automation model 141 may be used by remote device 140 to provide a user with an indication of the current statuses of device characteristics of home automation devices 130. For instance, a user may access an application being executed by remote device 140 to determine the current statuses of various characteristics of home automation devices 130. For instance, the user may be desiring to know if refrigerator 135 is turned on or if window 132 is locked. Home automation model 141, as maintained by remote device 140, may resemble the structure of master home automation model 120. However, in some embodiments, only a most recent (e.g., greatest in value) identifier associated with information used to update master home automation model 120 is maintained, other identifiers may not be necessary to be saved.

While ideally home automation model 141 is fully synchronized with master home automation model 120, this may not always be possible. For instance, remote device 140 may periodically not be in communication with home automation management engine 110. For example, a connection between remote device 140 and network 150 (represented by dotted line 151) may not always be available. As another example, remote device 140 may rely on an application to be executed by remote device 140 to stay in communication with home automation management engine 110 and update home automation model 141. If such an application is not being executed by remote device 140, it may not be possible to keep home automation model 141 synchronized with master home automation model 120. When remote device 140 is not in communication with home automation management engine 110, it may not be possible to keep home automation model 141 fully synchronized with master home automation model 120. For example, if, while remote device 140 is not in communication with home automation management engine 110, a device characteristic of window 132 changes from open to closed in master home automation model 120, at that time it may not be possible to update home automation model 141 to reflect the new status of window 132.

Remote model update engine 115 of home automation management engine 110 may be tasked with keeping home automation model 141 synchronized with master home automation model 120. Prior to remote device 140 providing an indication of statuses of device characteristics of home automation devices 130 to a user (or in some other way outputting such statuses), remote device 140 may check synchronization with master home automation model 120. To do this, remote device 140 may transmit a request to remote model update engine 115 via network 150. The request transmitted to remote model update engine 115 may be indicative of a request for synchronization and also an identifier representative of a last device characteristic update stored to home automation model 141. This identifier, which may be a numerical identifier, corresponds to an earlier generated identifier from incrementer 111 used in combination with model updater 112 to update master home automation model 120. That is, the identifier provided by mobile device 142 remote model update engine 115 corresponds to the last update synchronized from master home automation model 120 to home automation model 141. As such, it may be possible that, since the update associated with the identifier provided in the request that thousands of updates to device characteristics may have been made to master home automation model 120, no updates to device characteristics may have been made to master home automation model 120, or some number of updates in between.

It should be understood that regardless of the number of updates made to master home automation model 120, the storage size of master home automation model 120 will not vary significantly with time. Since only a current status of each device characteristic of home automation devices of home automation devices 130 is stored as part of master home automation model 120, the size of master home automation model 120 will not substantively increase based on the number of updates made to master home automation model 120. For instance, if light 138 changes its device characteristic from on to off, and off to on 1000 times, master home automation model 120 only stores the most recent status (along with an associated incremented identifier). The size of master home automation model 120 may be more directly dependent on the number of device characteristics (and, thus, the number of home automation devices) installed within the home automation system.

Remote model update engine 115 may receive the identifier as part of a request from remote device 140 and identifier comparator 114 may compare it to the most recent identifier added to master home automation model 120. If updates to master home automation model 120 has been made since the last time home automation model 141 has been updated, identifier comparator 114 identifies the difference between the values of the identifiers. This difference between the value of the identifier received from remote device 140 and the most recent identifier added to master home automation model 120 can be used to determine which device characteristics in home automation model 141 may be unsynchronized. For example, if the identifier received by remote model update engine 115 is 27 and the most recent identifier used to update master home automation model 120 is 35, the device characteristics associated with identifiers 28 through 35 in master home automation model 120 may be used to update home automation model 141. Besides these updates, home automation model 141 may be expected to otherwise be synchronized. The device characteristics associated with identifiers 28 to 35 may be transmitted by remote model update engine 115 to remote device 140 for use in updating home automation model 141. Once these device characteristics have been used to update home automation model 141, it can be expected that home automation model 141 will be synchronized with master home automation model 120 and home automation model 141 can be used to output statuses of home automation devices 130 for presentation to a user or to some other destination.

It may be possible for master home automation model 120 to become unsynchronized with home automation model 141 such that device characteristics identified by identifier comparator 114 and remote model update engine 115 as being needed to be updated at home automation model 141 are insufficient to fully synchronize the models. For instance, due to a long period of time elapsing since the last time home automation model 141 was updated, incrementer 111 may have reset its count. To confirm that home automation model 141 matches master home automation model 120 after device characteristics have been provided to home automation model 141 to bring home automation model 141 into synchronization with master home automation model 120, a checksum may be computed based on the values present within home automation model 141 by remote device 140. Similarly, home automation management engine 110 may use checksum engine 113 to compute a checksum value for master home automation model 120. These two checksum values may be compared, either by home automation management engine 110 or by remote device 140. If the checksum values do not match, it can be assumed that home automation model 141 varies in some respect from master home automation model 120. If such an occurrence is identified, home automation model 141 may be completely rebuilt from master home automation model 120 by transferring all device characteristics from master home automation model 120 to home automation model 141. If the checksum values match, it is determined that home automation model 141 is fully synchronized with master home automation model 120.

Figure 2:
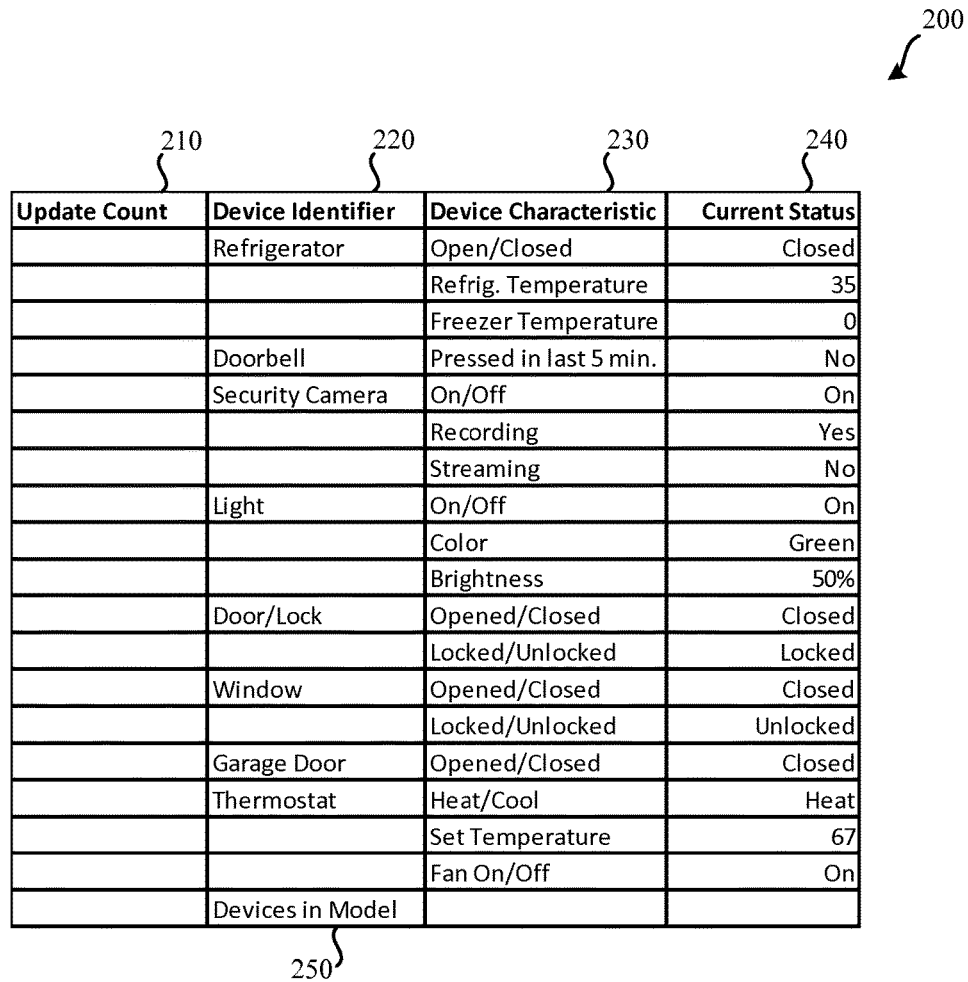
FIG. 2 illustrates an embodiment of a home automation model database.

FIG. 2 illustrates an embodiment of a master home automation model 200. Master home automation model 200 may represent an embodiment of master home automation model 120. Master home automation model 200 may be stored by home automation management engine 110 to a non-transitory computer readable storage medium. Master home automation model 200 may be stored in the form of a single table or multiple tables, a hierarchical tree of home automation devices, a database, or some other form of data storage arrangement. Illustrated in master home automation model 200 is a single table that is used to track the statuses of device characteristics of home automation devices 130 of home automation system 100. It should be understood that the device characteristics and the devices listed are merely exemplary; fewer or a greater number of devices may be present; similarly fewer or greater device characteristics may be present. Master home automation model 200 may include: update count 210, device identifier 220, device characteristic 230, and current status 240.

Device identifier 220 may serve to identify each home automation device present within home automation system. In master home automation model 200, device identifier 220 is shown as a name. It should be understood, that in some embodiments, a numerical identifier, such as a Mac address, may be used to uniquely identify each device present within a home automation system. For each device, one or more device characteristics may be present. For instance, "garage door" may have only a single device characteristic in device characteristics 230. However, another device, such as "light" may have three device characteristics in device characteristics 230. The number of device characteristics associated with any particular home automation device may be dependent on that particular type, make, and/or model of home automation device. Current statuses 240 may indicate the current status of the corresponding device characteristic. For instance, "35" refers to the temperature in degrees of the "Refrigerator Temperature" of the "Refrigerator." In addition to keeping track of the particular device characteristics 230 of devices in the home automation system, a master home automation model may keep track of the particular devices installed in the home automation system. Either maintained as part of the home automation model table or separately, information indicative of the home automation devices in the home automation system, represented here as devices in system 250, may be tracked to determine if home automation devices have been added or subtracted from the home automation system.

In master home automation model 200, as updates to device characteristics 230 are made, an identifier may be stored in relation to the device characteristic in update count 210. Each new identifier recorded to update count 210 may be incremented such as n=n+1, where n is the identifier. As such, in some embodiments, the identifiers may be numeric values that increment by one for each update made to master home automation model 200. If a particular device characteristic of device characteristics 230 is updated multiple times, the current status of that device characteristic may be overwritten with the most up-to-date value and the previous identifier in the corresponding update count may be replaced with the most recent identifier. As such, despite updates being recorded to master home automation model 200, the size of the model will not vary significantly based on the number of updates recorded to the model (but may rather increase in size with an increase in the number of device characteristics 230 stored).

FIG. 3 illustrates an embodiment of a master home automation model 300 that has been updated due to events occurring within the home automation system. Master home automation model 300 may represent master home automation model 200 of FIG. 2 that has been updated to include identifiers in update count 210.

Identifier 301, which has a value of one, has been linked with door/lock and its device characteristic of open/closed. Identifier 301 is present because master home automation model 300 has been updated such that the device characteristic opened/closed now has a current status of "open". The next update made to master home automation model 300, based on a change at a home automation device, is to the security camera. Identifier 302, which has a value of two, has been linked with the security camera and its device characteristic of on/off. Identifier 302 is recorded to master home automation model 300 because the device characteristic has been updated such that the device characteristic on/off now has a current status of "off".

Notably, there is no identifier "3" in update count 210, but there is an identifier "4." This is indicative of a situation in which an update corresponding to three in update count 210 was made but was subsequently overwritten by a later update, such as any of those corresponding to identifiers four through twelve. Accordingly, if a remote device's home automation model was updated based on the current state of master home automation model 300, no information related to identifier three would be provided to the remote device since it is no longer relevant to a current status of a home automation device. Identifier 303, which has a value of four, corresponds to the garage door home automation device, which has a device characteristic of opened/closed. The presence of identifier 303 is indicative of the status of this device characteristic being updated to open. Identifier 304, which has a value of five, corresponds to the light and its device characteristic of color. The presence of identifier 304 is indicative of the status of this device characteristic being updated to green. Identifiers 305, 306, and 307 represent similar updates to the master home automation model 300.

Of note, identifier 308 has a value of twelve, indicating the devices in the home automation system have changed. This may be indicative of a home automation device being added or subtracted from the home automation system. Thus, to the home automation model maintained by remote devices, a device, along with its one or more associated device characteristics, may need to be added or subtracted. Whether a device has been added to or subtracted from the master home automation model may be tracked similarly to a characteristic of device. That is, identifier 308 may be assigned to an entry corresponding to a listing of devices in the home automation system when an update has been made to such a list.

FIG. 4 illustrates an embodiment of a master home automation model 400 that has been updated due to events occurring within the home automation system and is used to update a remote device that has an out-of-date home automation model. Master home automation model 400 may represent an embodiment of master home automation model 120, 200, or 300. In the embodiment illustrated of master home automation model 400, the home automation model maintained by a remote device was last updated when the greatest identifier present within the master home automation model was six. In master home automation model 400, the greatest identifier present in update count 210 is twelve. From this, it can be ascertained that status is of device characteristics associated with values of identifiers of six or less are already current within the home automation model of the remote device. It can also be ascertained that the status of device characteristics associated with values of identifiers of greater than six may be out of date at the home automation model of the remote device. As such, current status 240 indicates an updated status of a device characteristic 230 associated with identifier 305, identifier 306, identifier 307, and identifier 308 may be provided to the remote device for use in updating its home automation model. The statuses of other device characteristics not corresponding to these identifiers may be assumed to already be synchronized between the master home automation model and the remote devices home automation model.

For identifiers missing between the remote device's previous most recent identifier (six) and the master home automation model's most recent identifier (twelve), it may be assumed that the statuses of device characteristics associated with these missing identifiers were overwritten prior to this update of the remote devices home automation model being performed, and are thus irrelevant to such an update that is concerned with only the current status of device characteristics.

Figure 5:
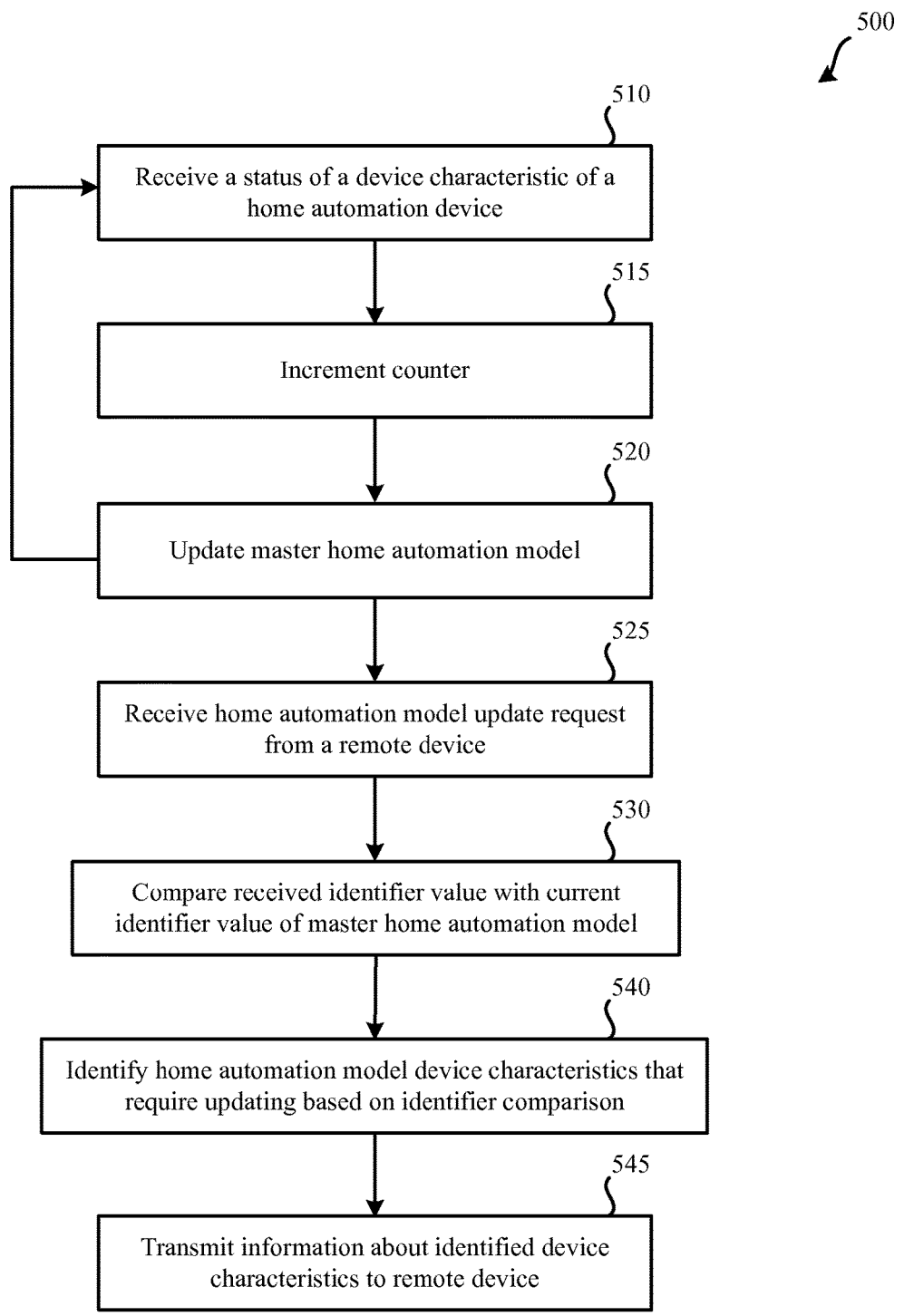
FIG. 5 illustrates an embodiment of a method for updating a home automation model of a remote device.

Various methods may be performed using the home automation system of FIG. 1 and the various embodiments of master home automation models detailed in relation to FIGS. 2 through 4. FIG. 5 illustrates an embodiment of a method 500 for updating a home automation model of a remote device. Method 500 may be performed using home automation system 100 of FIG. 1 and, possibly, the embodiments of a master home automation model detailed in relation to FIGS. 2 to 4. Alternatively, method 500 may be performed using some other form of home automation system and/or some other form of master home automation model. It should be understood that each step of method 500 may be performed using a home automation management engine, such as home automation management engine 110 of FIG. 1. Home automation management engine 110 may be incorporated as part of a home automation host, which may be implemented using a variety of computerized devices, such as a home computer system or a television receiver.

At step 510, the home automation management engine may receive a status of a home automation device. The status of the home automation device may be received from the home automation device itself. The status may be indicative of a particular device characteristic of the home automation device. In some instances, the status of a device characteristic of a home automation device may be derived from a command that is being sent to the home automation device. For instance, if the home automation management engine is sending a command to a light to turn it on, a device characteristic of on/off may be determined to be in the on state based on the command being sent to the light.

At step 515, a counter may be incremented. The counter may be an incremented in response to the device characteristic of a home automation device being updated to a master home automation model. Referring to home automation system 100, incrementer 111 may function as the counter. At step 520, the master home automation model may be updated to be indicative of the status received at step 510 and also to indicate the incremented identifier. Such a function may be performed by model updater 112 of home automation system 100. The incremented identifier may be stored in relation with the updated status of the device characteristic of the home automation device. Therefore, in the master home automation model, it can be determined that a particular device characteristic of a home automation device corresponds with the identifier. Steps 510 through 520 may be performed repeatedly as the statuses of various device characteristics of home automation devices in a home automation system change. For instance, it may be possible that steps 510 to 520 may be performed thousands of times before step 525 is performed. In other situations, step 525 may be performed after a single iteration, or even possibly zero iterations, of steps 510 to 520.

At step 525, a request may be received by the home automation management engine for an update to a home automation model maintained by a remote device. This request may be received from the remote device. The request may specify the last identifier for which the remote device's home automation model was updated. As such, if the master home automation model contains any subsequent identifiers to the identifier indicated in the request, the remote device's home automation model requires an update to be brought into synchronization with the master home automation model.

At step 530, the home automation management engine may compare the received identifier of those identifiers included as part of the request from the remote device with a current identifier stored in relation to the master home automation model. If the difference is present between the two numbers, the home automation model maintained by the remote device is out of synchronization with the master home automation model. If the values match, later steps of method 500 may be superfluous because the models are already in synchronization. If such an occurrence is present, method 500 may end at step 530.

Based on the comparison of the identifier values, at step 540, device characteristics may be identified in the master home automation model that are to be updated at the remote devices home automation model. Information about each device characteristic in the master home automation model having an identifier greater than the identifier received from the remote device in the request may be marked for transmission. At step 545, such information may be transmitted to the remote device for use in updating its home automation database. Once such information has been used to update the remote device's home automation model, the models are expected to be synchronized.

Figure 6:
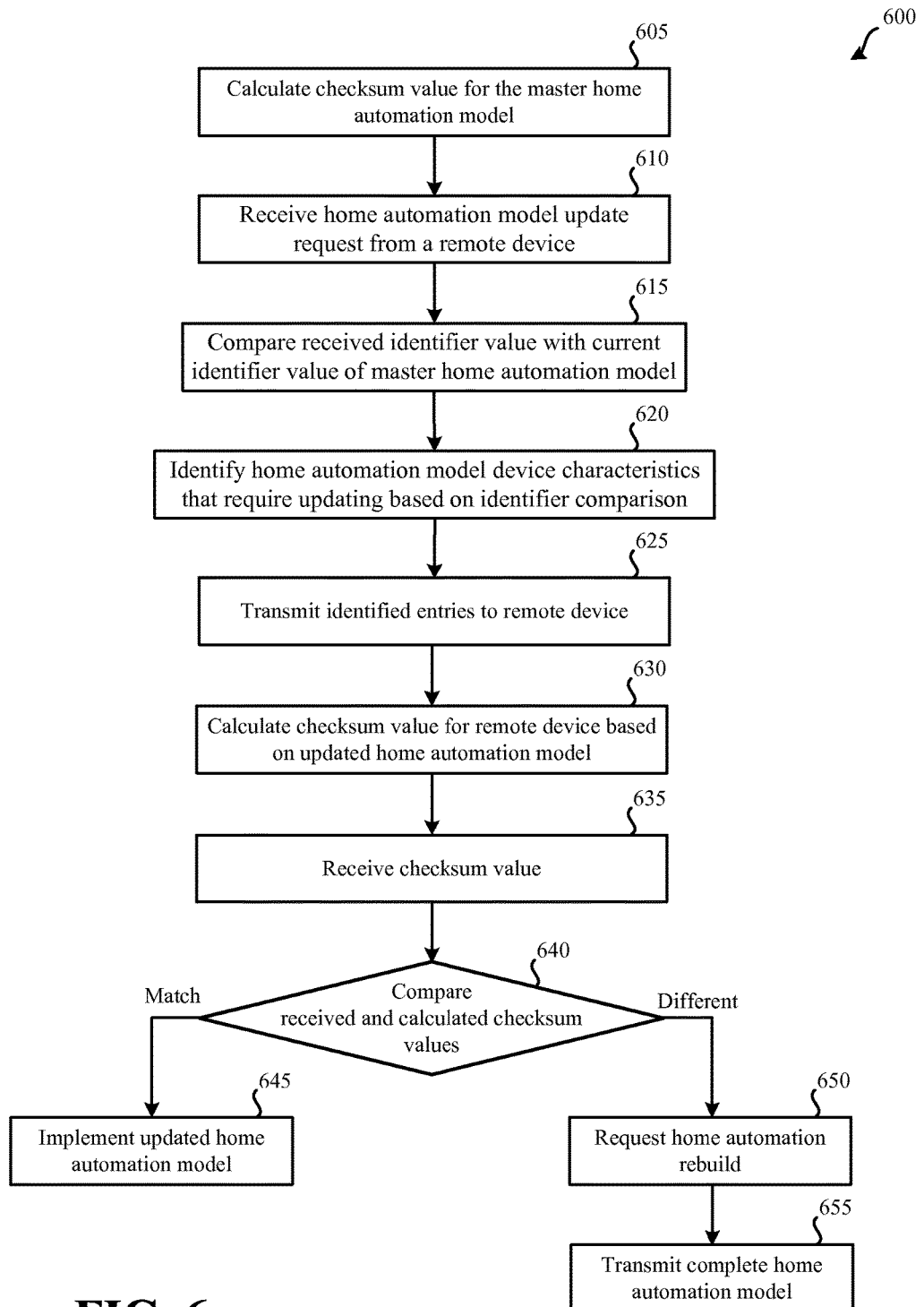
FIG. 6 illustrates another embodiment of a method for updating a home automation model of a remote device using checksums for verification of the home automation model.

FIG. 6 illustrates an embodiment of a method 600 for updating a home automation model of a remote device using checksums (or hash sums) for verification of the home automation model. Steps of method 600 may be performed in conjunction with method 500 of FIG. 5. Similarly to method 500, method 600 may be performed using home automation system 100 of FIG. 1 and, possibly, the embodiments of a master home automation model detailed in relation to FIGS. 2 to 4. Alternatively, method 600 may be performed using some other form of home automation system and/or some other form of master home automation model. It should be understood that each step of method 600 may be performed using a home automation management engine, such as home automation management engine 110 of FIG. 1 or a remote device, such as a desktop computer, smartphone, or tablet computer. Home automation management engine 110 may be incorporated as part of a home automation host, which may be implemented using a variety of computerized devices, such as a home computer system or a television receiver.

At step 605, a checksum value may be calculated by the home automation management engine for the master home automation model. The calculated checksum value may use each value of an update count, device identifier, device characteristic, and/or current status. In some embodiments, the calculated checksum is not based on the update count because not all of such values are maintained by the remote device. Referring to FIG. 4, each value in update count 210, device identifier 220, device characteristic 230, and current status 240 may be used to calculate a checksum value. Referring to home automation management engine 110 in FIG. 1, checksum engine 113 may be used to compute the checksum value for the master home automation model 120. The checksum value may only be calculated following a request being received from a remote device. Alternatively, each time an update is made to master home automation model 120, checksum engine 113 may recalculate the checksum value for the master home automation model 120. In some embodiments, rather than completely recalculating the checksum value, the master home automation model 120 may have one or more values attributed to the one or more characteristics (before the update) subtracted from the checksum and one or more values attributed to the one or more characteristics (including the update) added to the checksum value. Such an arrangement can decrease the amount of processing needed to compute the new checksum value.

Steps similar to steps 510-520 of method 500 may be performed as part of method 600 prior to or after step 605 to keep the master home automation model up-to-date. Steps 610-625 may be performed similarly to steps 525-545, as detailed in relation to method 500 of FIG. 5.

Once the home automation model has been updated at the remote device, the home automation model of the remote device may be used to calculate a checksum value at step 630. In some embodiments, this checksum value is calculated by the remote device. At step 635, in some embodiments, the checksum value calculated by the remote device is transferred to and received by the home automation management engine. In many embodiments, the checksum value calculated for the master home automation model by the home automation management engine may be transmitted to and received by the remote device. As such, following step 635, either the home automation management engine or the remote device has both checksum values. In many embodiments, the remote device will have both the checksum values for comparison.

At step 640, either the home automation management engine or the remote device performs a comparison of the two checksum values. If the two checksum values match at step 640, it has been determined that the home automation model of the remote device and the master home automation model match. The home automation model at the remote device is implemented at step 645 and can then be used for outputting information about the current status of home automation devices in the home automation system. For example, the remote device may output to a user indications of the current status of home automation devices of the home automation system.

Returning to step 640, if the two checksum values, calculated for the home automation model of the remote device and the master home automation model, do not match, method 600 may proceed from step 640 to step 650. At step 650, a complete home automation rebuilds may be requested by the remote device or initiated by the home automation management engine for the remote device. Since the two home automation models are out of synchronization, it is assumed that the master home automation model is correct. As such, the remote device's home automation model is completely rebuilt based on information from the master home automation model. At step 655, the complete home automation model is transmitted to the remote device. At step 655, all information necessary for the remote device to rebuild its home automation model may be transmitted from the home automation management engine to the remote device.

Figure 7:
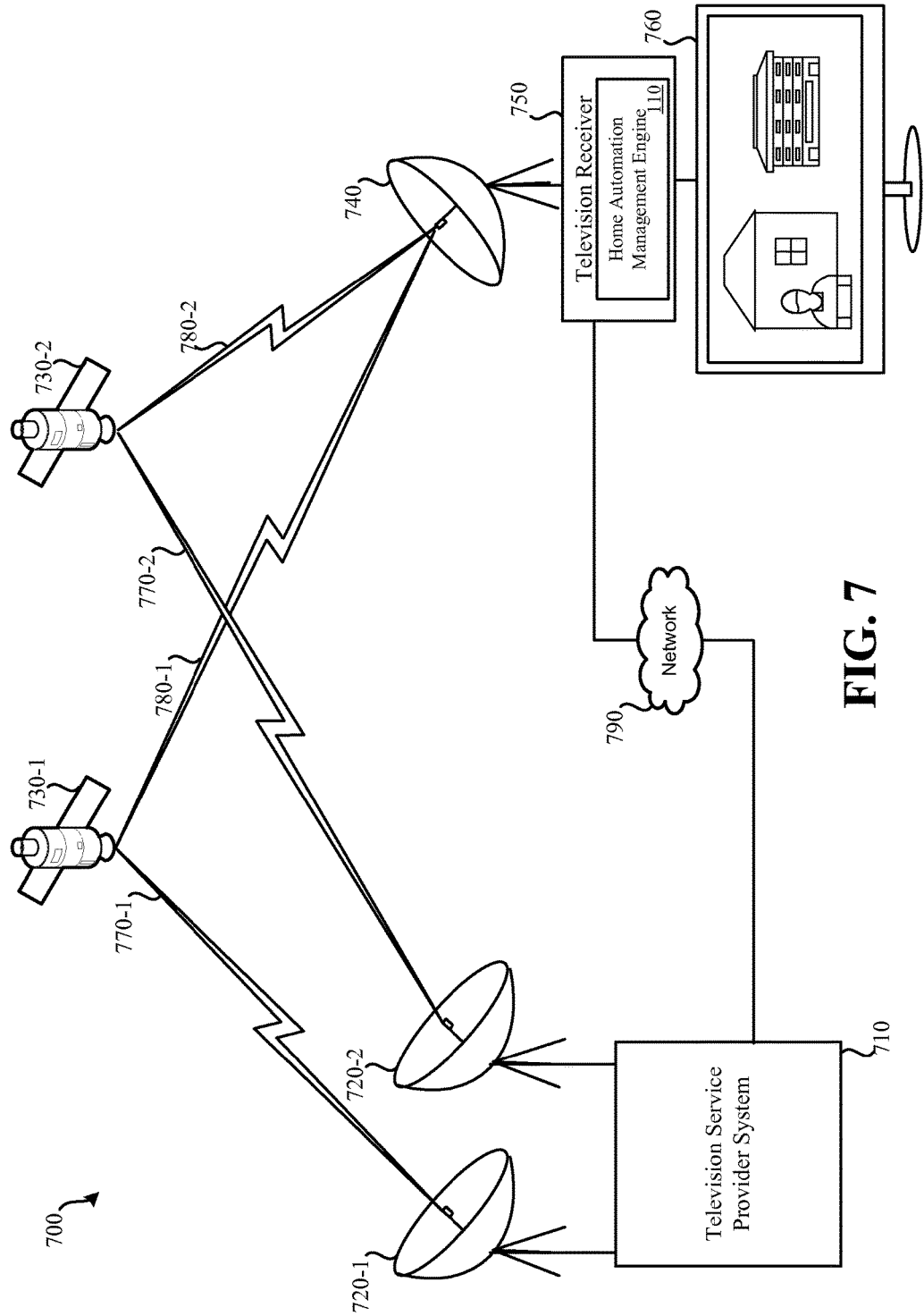
FIG. 7 illustrates an embodiment of a television distribution system that has an incorporated home automation management engine.

As previously noted, the home automation management engine may be part of a television receiver. As such, a television receiver may serve as the home automation host for a home automation system of a home (or other form of structure). FIG. 7 illustrates an embodiment of a satellite television distribution system 700 that has an incorporated home automation management engine and serves as a home automation host. Embodiments detailed herein may be applied to various television distribution systems, including cable and IP; a satellite television distribution system is provided as an example. Satellite television distribution system 700 may include: television service provider system 710, satellite transmitter equipment 720, satellites 730, satellite dish 740, television receiver 750, and television 760. Alternate embodiments of satellite television distribution system 700 may include fewer or greater numbers of components. While only one satellite dish 740, television receiver 750, and television 760 (collectively referred to as "user equipment") are illustrated, it should be understood that multiple (e.g., tens, thousands, millions) instances of user equipment may receive television signals from satellites 730.

Television service provider system 710 and satellite transmitter equipment 720 may be operated by a television service provider. A television service provider may distribute television channels, on-demand programming, programming information, and/or other services to users. Television service provider system 710 may receive feeds of one or more television channels from various sources. Such television channels may include multiple television channels that contain the same content (but may be in different formats, such as high-definition and standard-definition). To distribute such television channels to users, feeds of the television channels may be relayed to user equipment via one or more satellites via transponder streams. Satellite transmitter equipment 720 may be used to transmit a feed of one or more television channels from television service provider system 710 to one or more satellites 730. While a single television service provider system 710 and satellite transmitter equipment 720 are illustrated as part of satellite television distribution system 700, it should be understood that multiple instances of transmitter equipment may be used, possibly scattered geographically to communicate with satellites 730. Such multiple instances of satellite transmitting equipment may communicate with the same or with different satellites. Different television channels may be transmitted to satellites 730 from different instances of transmitting equipment. For instance, a different satellite dish of satellite transmitter equipment 720 may be used for communication with satellites in different orbital slots.

Satellites 730 may be configured to receive signals, such as streams of television channels, from one or more satellite uplinks such as satellite transmitter equipment 720. Satellites 730 may relay received signals from satellite transmitter equipment 720 (and/or other satellite transmitter equipment) to multiple instances of user equipment via transponder streams. Different frequencies may be used for uplink signals 770 from transponder stream 780. Each satellite 730 may be in a different orbital slot, such that the signal paths between each satellite, transmitter equipment, and user equipment vary. Each satellite 730 may have multiple transponders operating at different transmit frequencies. Multiple satellites 730 may be used to relay television channels from television service provider system 710 to satellite dish 740. Different television channels may be carried using different satellites and/or different transponders. Different television channels may also be carried using different transponders of the same satellite; thus, such television channels may be transmitted at different frequencies and/or different frequency ranges. As an example, a first and second television channel may be carried on a first transponder of satellite 730-1 (and thus be part of a first transponder stream). A third, fourth, and fifth television channel may be carried using a different satellite or a different transponder of the same satellite relaying the transponder stream at a different frequency (and thus be part of a second transponder stream). A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 740 may be a piece of user equipment that is used to receive transponder streams from one or more satellites, such as satellites 730. Satellite dish 740 may be provided to a user for use on a subscription basis to receive television channels provided by the television service provider system 710, satellite transmitter equipment 720, and/or satellites 730. Satellite dish 740 may be configured to relay transponder streams from multiple satellites and/or multiple transponders of the same satellite to television receiver 750. Based on the characteristics of television receiver 750 and/or satellite dish 740, it may only be possible to capture transponder streams from a limited number of transponders concurrently. For example, a tuner of television receiver 750 may only be able to tune to a single transponder stream from a transponder of a single satellite at a time.

In communication with satellite dish 740 may be one or more sets of receiving equipment. Receiving equipment may be configured to decode signals received from satellites 730 via satellite dish 740 for display on a display device, such as television 760. Receiving equipment may be incorporated as part of a television or may be part of a separate device, commonly referred to as a set-top box (STB). Receiving equipment may include a satellite tuner configured to receive television channels via a satellite. In FIG. 7, receiving equipment is present in the form of television receiver 750. Such a television receiver may have a home automation management engine 110 incorporated as part of a television receiver. As such, television receiver 750 may decode signals received via satellite dish 740 and provide an output to television 760. FIG. 2 provides additional detail of a television receiver. A television receiver is defined to include set-top boxes (STBs) and also circuitry having similar functionality that may be incorporated with another device. For instance, circuitry similar to that of television receiver 750 may be incorporated into a television. As such, while FIG. 7 illustrates an embodiment of television receiver 750 as separate from television 760, it should be understood that in other embodiments, similar functionality may be present in a television receiver integrated with television 760.

Television 760 may be used to present video and/or audio decoded by television receiver 750. Television receiver 750 may also output a display of one or more interfaces to television 760, such as an electronic programming guide (EPG). In some embodiments, a display device other than a television may be used.

Uplink signal 770-1 represents a signal between satellite transmitter equipment 720 and satellite 730-1. Uplink signal 770-2 represents a signal between satellite transmitter equipment 720 and satellite 730-2. Each of uplink signals 770 may contain streams of one or more different television channels. For example, uplink signal 770-1 may contain a certain group of television channels, while uplink signal 770-2 contains a different grouping of television channels. Each of these television channels may be scrambled such that unauthorized persons are prevented from accessing the television channels.

Transponder stream 780-1 represents a signal between satellite 730-1 and satellite dish 740. Transponder stream 780-2 represents a signal between satellite 730-2 and satellite dish 740. Each of transponder streams 780 may contain one or more different television channels in the form of transponder streams, which may be at least partially scrambled. For example, transponder stream 780-1 may include a first transponder stream containing a first group of television channels, while transponder stream 780-2 may include a second transponder stream containing a different group of television channels. A satellite may transmit multiple transponder streams to user equipment. For example, a typical satellite may relay thirty-two transponder streams via thirty-two transponders to user equipment. Further, spot beams are possible. For example, a satellite may be able to transmit a transponder stream to a particular geographic region (e.g., to distribute local television channels to the relevant market). Different television channels may be transmitted using the same frequency of the transponder stream to a different geographic region.

FIG. 7 illustrates transponder stream 780-1 and transponder stream 780-2 being received by satellite dish 740. For a first group of television channels, satellite dish 740 may receive a transponder stream of transponder stream 780-1; for a second group of channels, a transponder stream of transponder stream 780-2 may be received. Television receiver 750 may decode the received transponder stream. As such, depending on which television channel(s) are desired, a transponder stream from a different satellite (or a different transponder of the same satellite) may be accessed and decoded by television receiver 750. Further, while two satellites are present in satellite television distribution system 700, in other embodiments greater or fewer numbers of satellites may be present for receiving and transmitting transponder streams to user equipment.

Network 790 may serve as a secondary communication channel between television service provider system 710 and television receiver 750. Via such a secondary communication channel, bidirectional exchange of data may occur. As such, data may be transmitted to television service provider system 710 via network 790. Data may also be transmitted from television service provider system 710 to television receiver 750 via network 790. Network 790 may be the Internet. While audio and video services may be provided to television receiver 750 via satellites 730, feedback from television receiver 750 to television service provider system 710 may be transmitted via network 790.

FIG. 7 illustrates an example of a satellite-based television channel distribution system. It should be understood that at least some of the aspects of such a system may be similar to a cable television distribution system. For example, in a cable television system, rather than using satellite transponders, multiple RF channels on a cable may be used to transmit streams of television channels. As such, aspects detailed herein may be applicable to cable television distribution systems.

Figure 8:
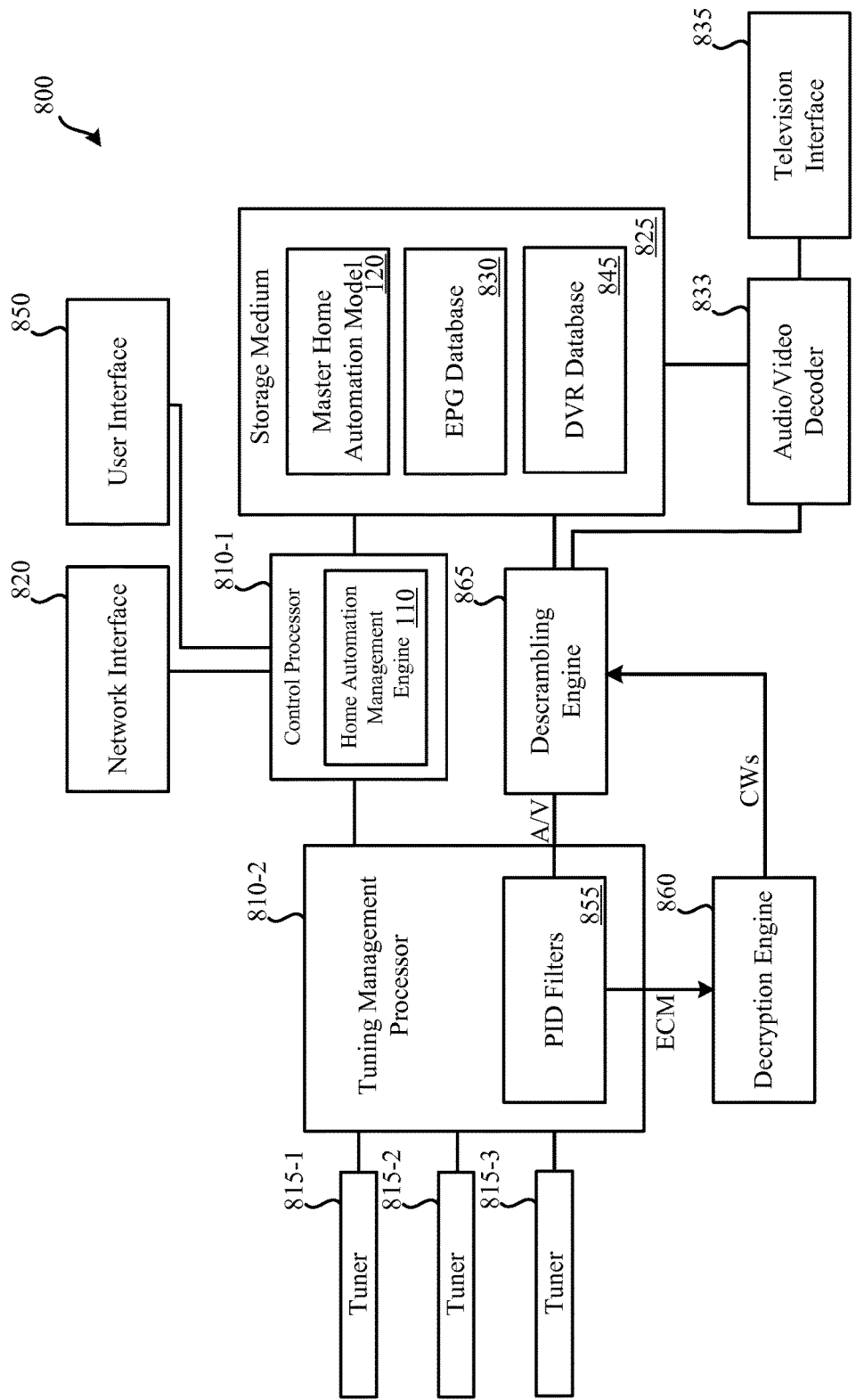
FIG. 8 illustrates an embodiment of a television receiver that has an incorporated home automation management engine.

FIG. 8 illustrates an embodiment of a television receiver 800 that has an incorporated home automation management engine and serves as a home automation host. Embodiments of television receiver 800 may include set top boxes (STBs). As previously noted, in addition to being in the form of an STB, a television receiver may be incorporated into another device, such as a television. For example, a television may have an integrated television receiver (which does not involve an external STB being coupled with the television). An STB may contain some or all of the components of television receiver 800 and/or may be able to perform some or all of the functions of television receiver 800. Accordingly, instances in this document referring to an STB and steps being performed by an STB may also be performed, more generally, by a television receiver.

FIG. 8 illustrates a block diagram of an embodiment of television receiver 800 that is configured to record omnibus channel files and extract a television program from a recorded omnibus channel file. Television receiver 800 may be television receiver of FIG. 1 and may be in the form of an STB that communicates with a display device such as a television. Television receiver 800 may be incorporated as part of a television, such as television 160 of FIG. 1. Television receiver 800 may include: processors 810 (which may include control processor 810-1 and tuning management processor 810-2), tuners 815, network interface 820, non-transitory computer-readable storage medium 825, electronic programming guide (EPG) database 830, television interface 835, digital video recorder (DVR) database 845, user interface 850, decryption engine 860, and/or descrambling engine 865. In other embodiments of television receiver 800, fewer or greater numbers of components may be present. It should be understood that the various components of television receiver 800 may be implemented using hardware, firmware, software, and/or some combination thereof. Functionality of components may be combined; for example, functions of descrambling engine 865 may be performed by tuning management processor 810-2. Further, functionality of components may be spread among additional components.

Processors 810 may include one or more specialized and/or general-purpose processors configured to perform processes such as tuning to a particular channel, accessing and causing EPG information from EPG database 830 to be displayed, and/or receiving and processing input from a user. For example, processors 810 may include one or more processors dedicated to decoding video signals from a particular format, such as MPEG, for output and display on a television and for performing decryption. Control processor 810-1 may include home automation management engine 110. It should be understood that the functions performed by various modules of FIG. 8 may be performed using one or more processors. As such, for example, functions of descrambling engine 865 may be performed by control processor 810-1.

Control processor 810-1 may communicate with tuning management processor 810-2. Control processor 810-1 may control the recording of television channels based on timers stored in DVR database 845. Control processor 810-1 may initiate recording of a television channel by sending a record command along with an indication of the television channel to be recorded to tuning management processor 810-2. Control processor 810-1 may not send a second record command (if additional recording is to begin at the same time) until an acknowledgement that recording of the first television channel has successfully been received and initiated by tuning management processor 810-2. Control processor 810-1 may also provide commands to tuning management processor 810-2 when recording of a television channel is to cease. In addition to providing commands relating to the recording of television channels, control processor 810-1 may provide commands to tuning management processor 810-2 that indicate television channels to be output to audio/video decoder 833 for output to a presentation device, such as a television.

Control processor 810-1 may also communicate with network interface 820 and user interface 850. Control processor 810-1 may handle incoming data from network interface 820 and user interface 850. Additionally, control processor 810-1 may be configured to output data via network interface 820.

Tuners 815 may include one or more tuners used to tune to television channels, such as television channels transmitted via satellite or cable. In the illustrated embodiment of television receiver 800, three tuners are present (tuner 815-1, tuner 815-2, and tuner 815-3). Each tuner contained in tuners 815 may be capable of receiving and processing a single stream of data from a satellite transponder (or a cable RF channel) at a given time. As such, a single tuner may tune to a single transponder (or, for a cable network, a single cable RF channel). If tuners 815 include multiple tuners, one tuner may be used to tune to a television channel on a first transponder stream for display using a television, while another tuner may be used to tune to a television channel on a second transponder for recording and viewing at some other time. Still another tuner may be used to check various television channels to determine if they are available or not. If multiple television channels transmitted on the same transponder stream are desired, a single tuner of tuners 815 may be used to receive the signal containing the multiple television channels for presentation and/or recording. Tuners 815 may receive commands from tuning management processor 810-2. Such commands may instruct tuners 815 which frequencies are to be used for tuning. Tuning management processor 810-2 may access one or more stored tables to determine a correct transponder stream (a correct satellite and transponder) to which to tune to receive a desired television channel.

Network interface 820 may be used to communicate via an alternate communication channel with a television service provider. For example, the primary communication channel may be via satellite (which may be unidirectional to the STB) and the alternate communication channel (which may be bidirectional) may be via a network, such as the Internet. Referring back to FIG. 7, television receiver 750 may be able to communicate with television service provider system 710 via a network, such as the Internet. This communication may be bidirectional: data may be transmitted from television receiver 750 to television service provider system 710 and from television service provider system 710 to television receiver 750. Referring back to FIG. 8, network interface 820 may be configured to communicate via one or more networks, such as the Internet, to communicate with television service provider system 710 of FIG. 7. Information may be transmitted and/or received via network interface 820.

Storage medium 825 may represent a non-transitory computer-readable storage medium. Storage medium 825 may include memory and/or a hard drive. Storage medium 825 may be used to store information received from one or more satellites and/or information received via network interface 820. Storage medium 825 may store information related to EPG database 830, master home automation model 120 (as previously detailed), and/or DVR database 845. Recorded television programs may be stored using storage medium 825.

EPG database 830 may store information related to television channels and the timing of programs appearing on such television channels. EPG database 830 may be stored using storage medium 825, which may be a hard drive. Information from EPG database 830 may be used to inform users of what television channels or programs are popular and/or provide recommendations to the user. Information from EPG database 830 may provide the user with a visual interface displayed by a television (or other form of display device) that allows a user to browse and select television channels and/or television programs for viewing and/or recording. Information used to populate EPG database 830 may be received via network interface 820 and/or via satellites, such as satellites 730 of FIG. 7 via tuners 815. For instance, updates to EPG database 830 may be received periodically via satellite. Data from EPG database 830 may be used to present an interface for a user to control DVR functions of television receiver 800, and/or to enable viewing and/or recording of multiple television channels simultaneously.

Audio/video decoder 833 may serve to convert encoded video and audio into a format suitable for output to a display device. For instance, audio/video decoder 833 may receive MPEG video and audio from storage medium 825 or descrambling engine 865 to be output to a television. MPEG video and audio from storage medium 824 may have been recorded to DVR database 845 as part of a previously-recorded television program. Audio/video decoder 833 may convert the MPEG video and audio into a format appropriate to be displayed by a television or other form of display device and audio into a format appropriate to be output from speakers, respectively.

Television interface 835 may serve to output a signal to a television (or another form of display device) in a proper format for display of video and playback of audio. As such, television interface 835 may output one or more television channels and stored television programming from storage medium 825 (e.g., television programs from DVR database 845 and/or information from EPG database 830) to a television for presentation.

A Digital Video Recorder (DVR) device may permit a television channel to be recorded for a period of time. DVR functionality of television receiver 800 may be managed by control processor 810-1. Control processor 810-1 may coordinate the television channel, start time, and stop time of when recording of a television channel is to occur. DVR database 845 may store information related to the recording of television stations. DVR database 845 may store timers that are used by control processor 810-1 to determine when a television channel should be tuned to and recorded to DVR database 845 of storage medium 825. In some embodiments, a limited amount of storage medium 825 may be devoted to DVR database 845. Timers may be set by the television service provider and/or one or more users of television receiver 800.

The DVR functionality of control processor 810-1 may have multiple modes. First, the DVR functionality of control processor 810-1 may be configured to record individual television programs selected by a user to DVR database 845. Using EPG database 830, a user may select a particular television program. Based on the date, time period, and television channel indicated by EPG database 830, control processor 810-1 may record the associated television program to DVR database 845. Second, DVR database 845 may be used to store recordings of predefined periods of time on one or more television channels defined by a television service provider. These predefined periods of time may include one or more television programs. For example, primetime programming on a particular television network may be recorded each weekday night. Further, multiple television channels may be recorded for such predefined periods of time. Such recording of television channels for predefined periods of time may be defined by the television service provider.

As an example of this second mode of DVR functionality, a television service provider may configure television receiver 800 to record television programming on multiple, predefined television channels for a predefined period of time, on predefined dates. For instance, a television service provider may configure television receiver 800 such that television programming may be recorded from 7 to 10 PM on NBC, ABC, CBS, and FOX on each weeknight. If a television program is selected for recording by a user and is also specified for recording by the television service provider, the user selection may serve as an indication to save the television program for an extended time (beyond the time which the predefined recording would otherwise be saved).

Further, DVR functionality may include control processor 810-1, or some other processing device of television receive 800, determining multiple television channels that can be recorded simultaneously using a single tuner to receive the multiple television channels. For example, a user may select a particular television program that is to be broadcast on a particular television channel for recording. Based on the television channel selected, control processor 810-1 may access a database, such as a stored database, to determine one or more additional television channels that are transmitted as part of the same transponder stream. In some embodiments, rather than consulting group database 844 to determine which television channels can be received concurrently using a single tuner, control processor 810-1 may examine a stored data storage arrangement to identify other television channels associated with the same frequency and/or satellite and transponder.

User interface 850 may include a remote control (physically separate from television receiver 800) and/or one or more buttons on television receiver 800 that allow a user to interact with television receiver 800. User interface 850 may be used to select a television channel for viewing, view information from EPG database 830, and/or program a timer stored to DVR database 845, wherein the timer is used to control the DVR functionality of control processor 810-1.

Referring back to tuners 815, television channels received via satellite (or cable) may contain at least some scrambled data. Packets of audio and video may be scrambled to prevent unauthorized users (e.g., nonsubscribers) from receiving television programming without paying the television service provider. When a tuner of tuners 815 is receiving data from a particular transponder of a satellite, the transponder stream may be a series of data packets corresponding to multiple television channels. Each data packet may contain a packet identifier (PID), which can be determined to be associated with a particular television channel. Particular data packets, referred to as entitlement control messages (ECMs), may be periodically transmitted. ECMs may be associated with another PID and may be encrypted; television receiver 800 may use decryption engine 860 (which may be in the form of a removable or non-removable smart card) to decrypt ECMs. Decryption of an ECM may only be possible if the user has authorization to access the particular television channel associated with the ECM. When an ECM is determined to correspond to a television channel being stored and/or displayed, the ECM may be provided to decryption engine 860 for decryption.

When decryption engine 860 receives an encrypted ECM, decryption engine 860 may decrypt the ECM to obtain some number of control words. In some embodiments, from each ECM received by decryption engine 860, two control words are obtained. In some embodiments, when decryption engine 860 receives an ECM, it compares the ECM to the previously received ECM. If the two ECMs match, the second ECM is not decrypted because the same control words would be obtained. In other embodiments, each ECM received by decryption engine 860 is decrypted; however, if a second ECM matches a first ECM, the outputted control words will match; thus, effectively, the second ECM does not affect the control words output by decryption engine 860. Decryption engine 860 may be permanently part of television receiver 800 or may be configured to be inserted and removed from television receiver 800.

Tuning management processor 810-2 may be in communication with tuners 815 and control processor 810-1. Tuning management processor 810-2 may be configured to receive commands from control processor 810-1. Such commands may indicate when to start/stop recording of a television channel and/or when to start/stop causing a television channel to be output to a television. Tuning management processor 810-2 may control tuners 815. Tuning management processor 810-2 may provide commands to tuners 815 that instruct the tuners to which satellite, transponder, and/or frequency to tune. From tuners 815, tuning management processor 810-2 may receive transponder streams of packetized data. As previously detailed, some or all of these packets may include a PID that identifies the content of the packet.

Tuning management processor 810-2 may be configured to create one or more PID filters 855 that sort packets received from tuners 815 based on the PIDs. When a tuner is initially tuned to a particular frequency (e.g., to a particular transponder of a satellite) a PID filter may be created based on a particular PID. PID filters 855 may be configured to filter data packets based on PIDs. In some embodiments, PID filters 855 are created and executed by tuning management processor 810-2. In other embodiments, separate hardware may be used to create and execute such PID filters. Depending on a television channel selected for recording/viewing, a PID filter may be created to filter the video and audio packets associated with the television channel. For example, if a transponder data stream includes multiple television channels, data packets corresponding to a television channel, that is not desired to be stored or displayed by the user, may be ignored by PID filters 855. As such, only data packets corresponding to the one or more television channels desired to be stored and/or displayed may be filtered and passed to either descrambling engine 865 or decryption engine 860; other data packets may be ignored. For each television channel, a stream of video packets, a stream of audio packets (one or both of the audio programs) and/or a stream of ECM packets may be present, each stream identified by a PID. In some embodiments, a common ECM stream may be used for multiple television channels. Additional data packets corresponding to other information, such as updates to a network information table, may be appropriately routed by PID filters 855. At a given time, one or multiple PID filters may be executed by tuning management processor 810-2.

Descrambling engine 865 may use the control words output by decryption engine 860 in order to descramble video and/or audio corresponding to television channels for storage and/or presentation. Video and/or audio data contained in the transponder data stream received by tuners 815 may be scrambled. Video and/or audio data may be descrambled by descrambling engine 865 using a particular control word. Which control word output by decryption engine 860 to be used for successful descrambling may be indicated by a scramble control identifier present within the data packet containing the scrambled video or audio. Descrambled video and/or audio may be output by descrambling engine 865 to storage medium 825 for storage (in DVR database 845) and/or to audio/video decoder 833 for output to a television or other presentation equipment via television interface 835.

Television receiver 800 may be configured to communicate wirelessly with home automation devices to allow home automation management engine 110 to communicate with such home automation devices (e.g., to receive status updates). In some embodiments, television receiver 800 is connected with an external device, such as a dongle, that allows for wireless communication with home automation devices. In some other embodiments, home automation management engine 110 may be implemented in an "overlay" device that is installed between a television receiver and a display device, allowing information to be presented to a user overlaid onto a video feed received from the television receiver.

For simplicity, television receiver 800 of FIG. 8 has been reduced to a block diagram; commonly known parts, such as a power supply, have been omitted. Further, some routing between the various modules of television receiver 800 has been illustrated. Such illustrations are for exemplary purposes only. The state of two modules not being directly or indirectly connected does not indicate the modules cannot communicate. Rather, connections between modules of the television receiver 800 are intended only to indicate possible common data routing. It should be understood that the modules of television receiver 800 may be combined into a fewer number of modules or divided into a greater number of modules. Further, the components of television receiver 800 may be part of another device, such as built into a television. Also, while television receiver 800 may be used to receive, store, and present television channels received via a satellite, it should be understood that similar components may be used to receive, store, and present television channels via a cable network.

Figure 9:
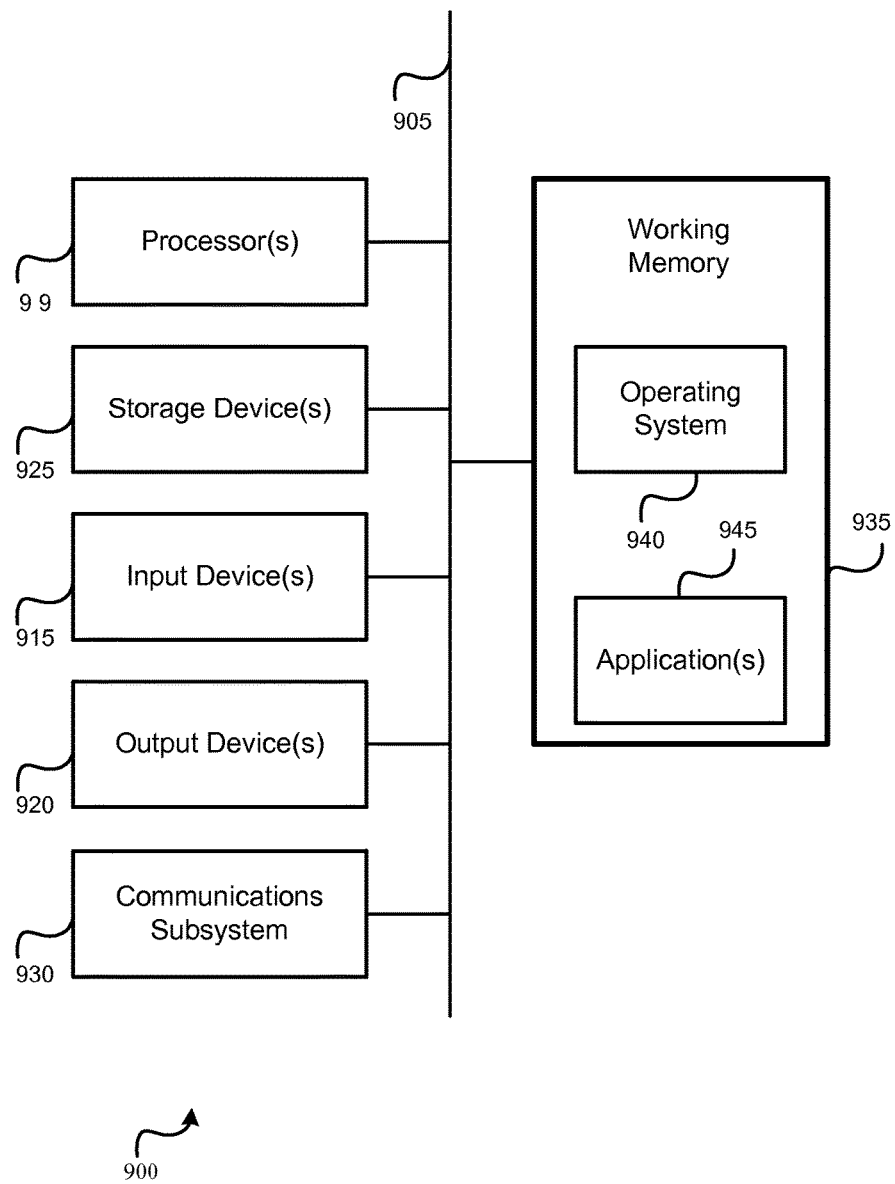
FIG. 9 illustrates an embodiment of a computer system.

FIG. 9 illustrates an embodiment of a computer system. A computer system as illustrated in FIG. 9 may be incorporated as part of the previously described computerized devices, such as to serve as the home automation host, as part of the television receiver, as the remote device maintaining a home automation mode, as the home automation management engine, and/or incorporated as part of any of home automation devices 130. FIG. 9 provides a schematic illustration of one embodiment of a computer system 900 that can perform various steps of the methods provided by various embodiments. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, video decoders, and/or the like); one or more input devices 915, which can include without limitation a mouse, a keyboard, remote control, and/or the like; and one or more output devices 920, which can include without limitation a display device, a printer, and/or the like.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 930 may permit data to be exchanged with a network (such as the network described below, to name one example), other computer systems, and/or any other devices described herein. In many embodiments, the computer system 900 will further comprise a working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 925 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the non-transitory storage device(s) 925. Merely by way of example, execution of the sequences of instructions contained in the working memory 935 might cause the processor(s) 910 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 (and/or components thereof) generally will receive signals, and the bus 905 then might carry the signals (and/or the data, instructions, etc. carried by the signals) to the working memory 935, from which the processor(s) 910 retrieves and executes the instructions. The instructions received by the working memory 935 may optionally be stored on a non-transitory storage device 925 either before or after execution by the processor(s) 910.

It should further be understood that the components of computer system 900 can be distributed across a network. For example, some processing may be performed in one location using a first processor while other processing may be performed by another processor remote from the first processor. Other components of computer system 900 may be similarly distributed. As such, computer system 900 may be interpreted as a distributed computing system that performs processing in multiple locations. In some instances, computer system 900 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system for maintaining an up-to-date home automation model, the system comprising:
a remote device configured to perform wireless communication and to maintain a remotely-stored home automation model of a home automation system; and
a home automation host system, comprising:
one or more wireless interfaces;
a master home automation model that is stored as a database that tracks current operating characteristics of a plurality of home automation devices, wherein:
for each home automation device of the plurality of home automation devices, the database links: an update counter; a device characteristic;
a device identifier, and a current status;
a plurality of entries correspond to home automation device characteristics of the plurality of home automation devices; and
the remotely-stored home automation model is stored by the remote device remotely from the master home automation model stored by the home automation host system;
one or more processors; and
a memory communicatively coupled with and readable by the one or more processors and having stored therein processor-readable instructions which, when executed by the one or more processors, cause the one or more processors to:
communicate with a plurality of home automation devices installed in a home as part of a home automation system via the one or more wireless interfaces using one or more communication protocols to obtain status updates;
receive a first status update of a home automation device of the plurality of home automation devices;
update an entry of a plurality of entries in a master home automation model based on the first status update of the home automation device;
increment an update counter used to track status updates related to the home automation system in the home; and
assign, within the master home automation model, the incremented update counter to the device update count linked with the device characteristic of the home automation device in the master home automation model;
receive, from the remote device, a request for an update to the remotely-stored home automation model of the home automation system, wherein:
the request indicates a most-recent update counter stored by the remote device;
compare the most-recent update counter received from the remote device with the incremented update counter of the master home automation model maintained by the home automation host system;
determine that information from the entry of the plurality of entries of the master home automation model is to be transmitted to the remote device based on comparing the most-recent update counter received from the remote device with the incremented update counter of the master home automation model maintained by the home automation host system; and cause the information from the entry of plurality of entries of the master home automation model to be transmitted to the remote device based on comparing the most-recent update counter received from the remote device with the incremented update counter of the master home automation model maintained by the home automation host system, the information being indicative of the first status update, wherein:

the remote device updates the remotely-stored home automation model based on the information transmitted by the home automation host system to the remote device.

2. The system for maintaining the up-to-date home automation model of claim 1, wherein the processor-readable instructions, when executed, further cause the one or more processors to:

prior to receiving the first status update, receive a second status update of the home automation device installed as part of the home automation system in the home; and update the entry of the plurality of entries in the master home automation model based on the second status update of the home automation device, wherein the second status update is subsequently overwritten by the first status update and no request for the update to the remotely-stored home automation model is received from the remote device between updating the entry based on the second status update and updating the entry based on the first status update.

3. The system for maintaining the up-to-date home automation model of claim 2, wherein no information indicative of the second status update is transmitted to the remote device.

4. The system for maintaining the up-to-date home automation model of claim 1, the system further comprising:

the home automation device; and the remote device, wherein the remote device is a wireless device that only intermittently updates the remotely-stored home automation model.

5. The system for maintaining the up-to-date home automation model of claim 4, wherein the processor-readable instructions, when executed, further cause the one or more processors to:

calculate a master checksum value based on the master home automation model; and cause the master checksum value to be transmitted to the remote device.

6. The system for maintaining the up-to-date home automation model of claim 5, wherein the remote device is configured to:

calculate a remote checksum value based on the remotely-stored home automation model;

compare the master checksum value received from the home automation host system with the calculated remote checksum value; and request a rebuild of the remotely-stored home automation model based on comparing the master checksum value with the calculated remote checksum value.

7. A method for maintaining an up-to-date home automation model, the method implemented with at least one processor coupled with memory-stored executable instructions which, when executed by the at least one processor, cause the at least one processor to perform the method, comprising:

communicating, by a home automation host system, with a plurality of home automation devices installed in a home as part of a home automation system via one or more wireless interfaces using one or more communication protocols to obtain status updates;

receiving, by the home automation host system, a first status update of a home automation device of the plurality of home automation devices installed as part of the home automation system in the home;

updating, by the home automation host system, an entry of a plurality of entries in a master home automation model based on the first status update of the home automation device, wherein:

the master home automation model is:

stored and maintained by the home automation host system as a database that tracks current operating characteristics of the plurality of home automation devices, wherein:

for each home automation device of the plurality of home automation devices, the database links: an update counter; a device characteristic; a device identifier, and a current status; and the plurality of entries correspond to home automation device characteristics of the plurality of home automation devices;

incrementing, by the home automation host system, an update counter used to track status updates related to the home automation system in the home; and assigning, by the home automation host system, within the master home automation model, the incremented update counter to the device update count linked with the device characteristic of the home automation device in the master home automation model;

receiving, by the home automation system from a remote device, a request for an update to a remotely-stored home automation model of the home automation system, wherein:

the remotely-stored home automation model is stored by the remote device remotely from the master home automation model stored by the home automation host system, and the request indicates a most-recent update counter stored by the remote device;

comparing, by the home automation system, the most-recent update counter received from the remote device with the incremented update counter of the master home automation model maintained by the home automation host system;

determining, by the home automation system, that information from the entry of the plurality of entries of the master home automation model is to be transmitted to the remote device based on comparing the most-recent update counter received from the remote device with the incremented update counter of the master home automation model maintained by the home automation host system; and causing, by the home automation system, the information from the entry of plurality of entries of the master home automation model to be transmitted to the remote device based on comparing the most-recent update counter received from the remote device with the incremented update counter of the master home automation model maintained by the home automation host system, the information being indicative of the first status update; wherein the remote device updates the remotely-stored home automation model based on the information transmitted by the home automation host system.

8. The method for maintaining the up-to-date home automation model of claim 7, the method further comprising:
prior to receiving the first status update, receiving, by the home automation host system, a second status update of the home automation device installed as part of the home automation system in the home; and
updating, by the home automation host system, the entry of the plurality of entries in the master home automation model based on the second status update of the home automation device, wherein the second status update is subsequently overwritten by the first status update and no request for the update to the remotely-stored home automation model is received from the remote device between updating the entry based on the second status update and updating the entry based on the first status update.

9. A non-transitory processor-readable medium for maintaining an up-to-date home automation model at a home automation host system, comprising processor-readable instructions configured to cause one or more processors to:
communicate with a plurality of home automation devices installed in a home as part of a home automation system via one or more wireless interfaces and via one or more communication protocols to obtain status updates;
receive a first status update of a home automation device installed as part of a home automation system in a home, the home automation system comprising a plurality of home automation devices;
update an entry of a plurality of entries in a master home automation model based on the first status update of the home automation device, wherein:
for each home automation device of the plurality of home automation devices, the database links: an update counter; a device characteristic;
a device identifier, and a current status;
the plurality of entries correspond to home automation device characteristics of the plurality of home automation devices;

increment a numerical identifier used to track status updates related to the home automation system in the home;
assign, within the master home automation model, the incremented numerical identifier to the updated entry in the master home automation model;
receive, from a remote device, a request for an update to a remotely-stored home automation model of the home automation system, wherein:
the remotely-stored home automation model is stored by the remote device remotely from the master home automation model stored by the home automation host system, and
the request indicates a remote update counter stored by the remote device;
compare the remote update counter received from the remote device with an update counter of the master home automation model maintained by the home automation host system;
determine that information from the entry of the plurality of entries of the master home automation model is to be transmitted to the remote device based on comparing the remote update counter received from the remote device with the update counter of the master home automation model maintained by the home automation host system; and
cause the information from the entry of plurality of entries of the master home automation model to be transmitted to the remote device based on comparing the remote update counter received from the remote device with the update counter of the master home automation model maintained by the home automation host system, the information being indicative of the first status update wherein:
the remote device updates the remotely-stored home automation model based on the information transmitted by the home automation host system to the remote device.

* * * * *